(12) United States Patent
Yasumatsu et al.

(10) Patent No.: US 11,546,563 B2
(45) Date of Patent: Jan. 3, 2023

(54) LIGHT SOURCE DEVICE, PROJECTOR, AND DISPLAY DEVICE

(71) Applicant: SEIKO EPSON CORPORATION, Tokyo (JP)

(72) Inventors: Wataru Yasumatsu, Azumino (JP); Norio Nakamura, Matsumoto (JP); Yuta Tokuno, Azumino (JP); Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/492,397

(22) Filed: Oct. 1, 2021

(65) Prior Publication Data

US 2022/0109813 A1 Apr. 7, 2022

(30) Foreign Application Priority Data

Oct. 2, 2020 (JP) .............................. JP2020-167570

(51) Int. Cl.
  *G03B 21/20* (2006.01)
  *G02B 27/28* (2006.01)
  *G02B 5/30* (2006.01)
  *H04N 9/31* (2006.01)

(52) U.S. Cl.
  CPC ......... *H04N 9/3167* (2013.01); *G02B 27/283* (2013.01); *G03B 21/204* (2013.01); *G03B 21/208* (2013.01); *G03B 21/2073* (2013.01); *H04N 9/31* (2013.01)

(58) Field of Classification Search
  CPC .. H04N 9/3167; G02B 27/283; G03B 21/204; G03B 21/2073; G03B 21/208
  USPC .................................................. 353/48
  See application file for complete search history.

(56) References Cited

U.S. PATENT DOCUMENTS

| | | |
|---|---|---|
| 5,161,042 A | 11/1992 | Hamada |
| 10,915,014 B1 | 2/2021 | Akiyama |
| 2002/0024618 A1* | 2/2002 | Imai ..................... G09G 3/3413 348/743 |
| 2005/0248736 A1 | 11/2005 | Itoh |
| 2008/0062386 A1 | 3/2008 | Ito |
| 2013/0027670 A1 | 1/2013 | Akiyama et al. |
| 2020/0201155 A1 | 6/2020 | Akiyama |
| 2020/0249555 A1 | 8/2020 | Akiyama |

(Continued)

FOREIGN PATENT DOCUMENTS

| | | |
|---|---|---|
| JP | H04-060538 A | 2/1992 |
| JP | 2000-131762 A | 5/2000 |

(Continued)

*Primary Examiner* — Jerry L Brooks
(74) *Attorney, Agent, or Firm* — Oliff PLC

(57) ABSTRACT

A light source device according to the present disclosure includes a light source section, a first polarization split element for transmitting first light with a first polarization direction from the light source section and reflecting the first light with a second polarization direction, a first retardation element, a second polarization split element for reflecting the first light in the second polarization direction from the first retardation element, a second retardation element, and a light conversion device having a diffusion element for diffusing the first light from the second retardation element, a first wavelength conversion element for performing wavelength conversion on the first light to emit second light, and a substrate.

12 Claims, 15 Drawing Sheets

(56) References Cited

U.S. PATENT DOCUMENTS

| | | | |
|---|---|---|---|
| 2020/0252589 A1 | 8/2020 | Akiyama | |
| 2020/0285138 A1* | 9/2020 | Kurata | ............... G03B 21/2066 |
| 2020/0304762 A1 | 9/2020 | Nakamura | |
| 2020/0304765 A1 | 9/2020 | Nakamura | |
| 2020/0314397 A1 | 10/2020 | Akiyama | |

FOREIGN PATENT DOCUMENTS

| | | | |
|---|---|---|---|
| JP | 2005-321502 A | 11/2005 |
| JP | 2008-065250 A | 3/2008 |
| JP | 2013-167812 A | 8/2013 |
| JP | 2014-106453 A | 6/2014 |
| JP | 2014-182206 A | 9/2014 |
| JP | 2015-060035 A | 3/2015 |
| JP | 2019-053241 A | 4/2019 |
| JP | 2020-034821 A | 3/2020 |
| JP | 2020-101711 A | 7/2020 |
| JP | 2020-106692 A | 7/2020 |
| JP | 2020-126089 A | 8/2020 |
| JP | 2020-126170 A | 8/2020 |
| JP | 2020-154196 A | 9/2020 |
| JP | 2020-154198 A | 9/2020 |
| JP | 2020-160236 A | 10/2020 |
| JP | 2021-033165 A | 3/2021 |

* cited by examiner

LIGHT SOURCE DEVICE, PROJECTOR, AND DISPLAY DEVICE

The present application is based on, and claims priority from JP Application Serial Number 2020-167570, filed Oct. 2, 2020, the disclosure of which is hereby incorporated by reference herein in its entirety.

BACKGROUND

1. Technical Field

The present disclosure relates to a light source device, a projector, and a display device.

2. Related Art

There has been known a projector which modulates light emitted from a light source to generate image light based on image information, and then projects the image light thus generated. In JP-A-4-60538 (Document 1), there is disclosed a projection type color image display device provided with a light source, a plurality of dichroic mirrors, a liquid crystal display element having a microlens array, and a projection lens. The projection type color image display device separates the white light emitted from the light source into a plurality of colored light beams having respective colors different from each other, and then makes the colored light beams thus separated from each other enter the respective sub-pixels different from each other in one liquid crystal display element to thereby perform color display.

In the projection type color image display device described above, there are arranged a red reflecting dichroic mirror, a green reflecting dichroic mirror, and a blue reflecting dichroic mirror along the incident light axis of the white light emitted from the light source in a state of being nonparallel to each other. The white light emitted from the light source passes through the dichroic mirrors described above to thereby be separated into red light, green light, and blue light different in proceeding direction from each other. The red light, the green light, and the blue light respectively enter red sub-pixels, green sub-pixels, and blue sub-pixels of the light modulation element in the state of being spatially separated from each other by a microlens disposed at the incidence side of the light modulation element.

In the projection type color image display device in Document 1, a lamp light source such as a halogen lamp or a xenon lamp is adopted as the white light source, and a liquid crystal display element is adopted as the light modulation element. Although the light emitted from the lamp light source is unpolarized light, when using the liquid crystal display element as the light modulation element, the light entering the liquid crystal display element needs to be linearly polarized light having a specific polarization direction. To this end, it is conceivable to dispose a pair of multi-lens arrays for dividing the incident light into a plurality of partial light beams, and a polarization conversion element for uniforming the polarization directions of the plurality of partial light beams between the white light source and the liquid crystal display element as a device for homogenously illuminating the liquid crystal display element. In this case, there is generally used a polarization conversion element provided with a plurality of polarization split layers and a plurality of reflecting layers alternately arranged along a direction crossing the incident direction of the light, and a retardation layer disposed in a light path of the light transmitted through the polarization split layers or a light path of the light reflected by the reflecting layers.

However, when reducing the projection type color image display device described above in size in compliance with the recent demand of reduction in size, it is difficult to manufacture the polarization conversion element narrow in pitch between the polarization split layer and the reflecting layer. Therefore, it is difficult to reduce the size of the light source device equipped with this type of polarization conversion element, and by extension, to reduce the size of the projector equipped with the light source device. In view of such a problem, it is required to provide a light source device capable of emitting a plurality of colored light beams from respective positions spatially different from each other without using the polarization conversion element narrow in pitch.

Further, the projector provided with a single liquid crystal panel, namely a so-called single-panel type projector, becomes higher in energy density of light with which each of pixels of the liquid crystal panel is irradiated compared to a projector provided with three liquid crystal panels for respectively modulating the red light, the green light, and the blue light. In particular, the blue light exerts serious damage caused by the irradiation with the light to the sub-pixels irradiated with the blue light compared to the red light and the green light. Therefore, there is a possibility that the sub-pixels of the liquid crystal panel are damaged, and thus, the reliability of the liquid crystal panel is deteriorated.

SUMMARY

In view of the problems described above, A light source device according to an aspect of the present disclosure includes a light source section configured to emit light which has a first wavelength band and includes a first light beam polarized in a first polarization direction and the first light beam polarized in a second polarization direction different from the first polarization direction, a first polarization split element configured to transmit the first light beam which is polarized in the first polarization direction and enters the first polarization split element along a first direction from the light source section toward the first direction, and configured to reflect the first light beam which is polarized in the second polarization direction toward a second direction crossing the first direction, a first retardation element disposed at the first direction side of the first polarization split element, and configured to convert the first light beam which is polarized in the first polarization direction and enters the first retardation element along the first direction from the first polarization split element into the first light beam polarized in the second polarization direction, a second polarization split element disposed at the first direction side of the first retardation element, and configured to reflect the first light beam which is polarized in the second polarization direction and enters the second polarization split element along the first direction from the first retardation element toward the second direction, a second retardation element which the first light beam polarized in the second polarization direction enters along the second direction from the first polarization split element and the second polarization split element, and a light conversion device having a diffusion element configured to diffuse the first light beam which enters the diffusion element along the second direction from the second retardation element to emit the first light beam diffused toward a third direction as an opposite direction to the second direction, a first wavelength conversion element configured to perform wavelength conversion on the first light beam which enters the first wavelength conversion element along the second direction from the second retardation element to emit a second light beam having a second wavelength band different from the first wavelength band toward the third direction, and a substrate which rotates around a rotational axis along a proceeding direction of the first light beam, wherein the diffusion element and the first wavelength conversion element are disposed side by side on a same circumference centering on the rotational axis on a surface of the substrate, the second retardation element is disposed between the first polarization split element and the substrate, the second retardation element is disposed between the second polarization split element and the substrate, the first polarization split element transmits the first light beam which enters the first polarization split element along the third direction from the diffusion element toward the third direction, and transmits the second light beam which enters the first polarization split element along the third direction from the first wavelength conversion element toward the third direction, and the second polarization split element transmits the first light beam which enters the second polarization split element along the third direction from the diffusion element toward the third direction, and transmits the second light beam which enters the second polarization split element along the third direction from the first wavelength conversion element toward the third direction.

A projector according to another aspect of the present disclosure includes the light source device according to the aspect of the present disclosure, a light modulation device configured to modulate light from the light source device in accordance with image information, and a projection optical device configured to project the light modulated by the light modulation device.

A display device according to another aspect of the present disclosure includes a light source device, and a light modulation device configured to modulate light from the light source device in accordance with image information, wherein the light modulation device has a liquid crystal panel having a plurality of pixels, each of the pixels has at least a first sub-pixel and a second sub-pixel, the light source device emits a first light beam having a first wavelength band, and emits a second light beam having a second wavelength band different from the first wavelength band, and the light source device has a switching section configured to switch between a first state in which the first light beam enters the first sub-pixel, and the second light beam enters the second sub-pixel, and a second state in which the first light beam enters the second sub-pixel, and the second light beam enters the first sub-pixel.

DESCRIPTION OF EXEMPLARY EMBODIMENTS

First Embodiment

A first embodiment of the present disclosure will hereinafter be described using FIG. 1 through FIG. 7.

Figure 1:
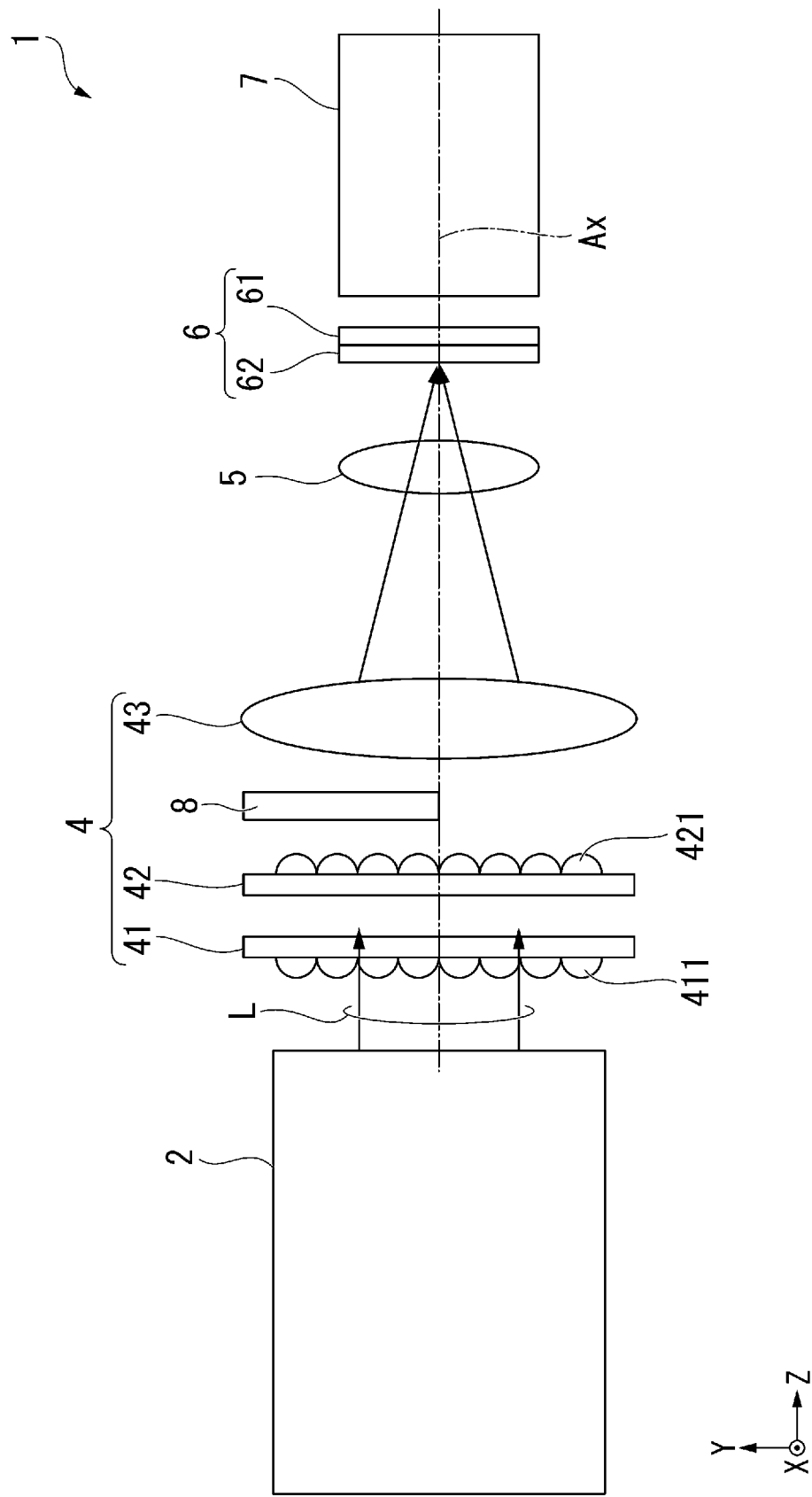
FIG. 1 is a schematic configuration diagram of a projector according to a first embodiment.

FIG. 1 is a schematic configuration diagram of a projector 1 according to the present embodiment.

It should be noted that in each of the drawings described below, the constituents are shown with the scale ratios of respective sizes set differently between the constituents in some cases in order to make each of the constituents eye-friendly.

The projector 1 according to the present embodiment modulates the light emitted from a light source device 2 to form an image corresponding to image information, and then projects the image thus formed on a projection target surface such as a screen in an enlarged manner. In other words, the projector 1 modulates the light emitted from the light source device 2 with a single light modulation device 6 including a single liquid crystal panel 61 to thereby form the image, and then projects the image thus formed. The projector 1 is a so-called single-panel projector.

As shown in FIG. 1, the projector 1 is provided with a light source device 2, a homogenization device 4, a polarization conversion element 8, a field lens 5, a light modulation device 6, and a projection optical device 7. The light source device 2, the homogenization device 4, the polarization conversion element 8, the field lens 5, the light modulation device 6, and the projection optical device 7 are disposed at predetermined positions along an illumination light axis Ax. The illumination light axis Ax is defined as an axis along the proceeding direction of the principal ray of the light L emitted from the light source 2.

The configuration of the light source device 2 and the homogenization device 4 will be described later in detail. The field lens 5 is disposed between the homogenization device 4 and the light modulation device 6. The field lens 5 collimates the light L emitted from the homogenization device 4, and then guides the result to the light modulation device 6. The polarization conversion element 8 is disposed at a position where some light beams of the light L emitted from the light source device 2 enter. The polarization conversion element 8 uniforms the polarization directions of the light beams which enter the polarization conversion element 8 into a polarization direction of another light beam.

The projection optical device 7 projects the light modulated by the light modulation device 6, namely the light forming the image, on the projection target surface (not shown) such as a screen. The projection optical device 7 has a single projection lens or a plurality of projection lenses.

In the following description, the axis parallel to the proceeding direction of the light emitted from the light source device 2 along the illumination light axis Ax is defined as a Z axis, and the proceeding direction of the light is defined as a +Z direction. Further, two axes each perpendicular to the Z axis, and perpendicular to each other are defined as an X axis and a Y axis. Out of the directions along these axes, an upper side in the vertical direction in the space in which the projector 1 is installed is defined as a +Y direction. Further, the right side in the horizontal direction when viewing an object which the light enters along the +Z direction so that the +Y direction points the upper side in the vertical direction is defined as a +X direction. Although not shown in the drawings, an opposite direction to the +X direction is defined as a −X direction, an opposite direction to the +Y direction is defined as a −Y direction, and an opposite direction to the +Z direction is defined as a −Z direction.

The +X direction in the present embodiment corresponds to a first direction in the appended claims. The −Z direction in the present embodiment corresponds to a second direction in the appended claims. The +Z direction in the present embodiment corresponds to a third direction in the appended claims. The −X direction in the present embodiment corresponds to a fourth direction in the appended claims. The −Y direction in the present embodiment corresponds to a fifth direction in the appended claims.

Configuration of Light Source Device

Figure 2:
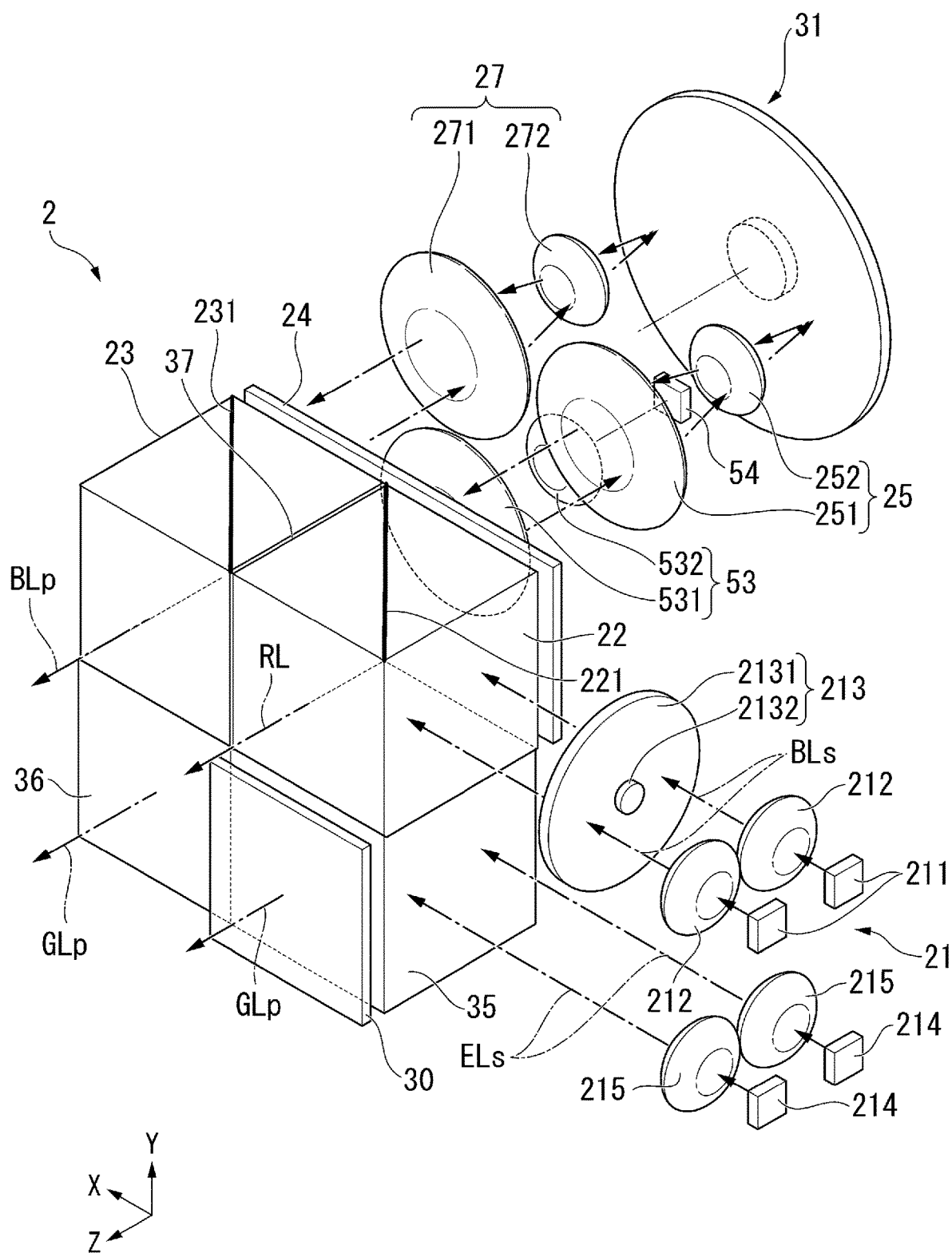
FIG. 2 is a perspective view of a light source device according to the first embodiment.
Figure 3:
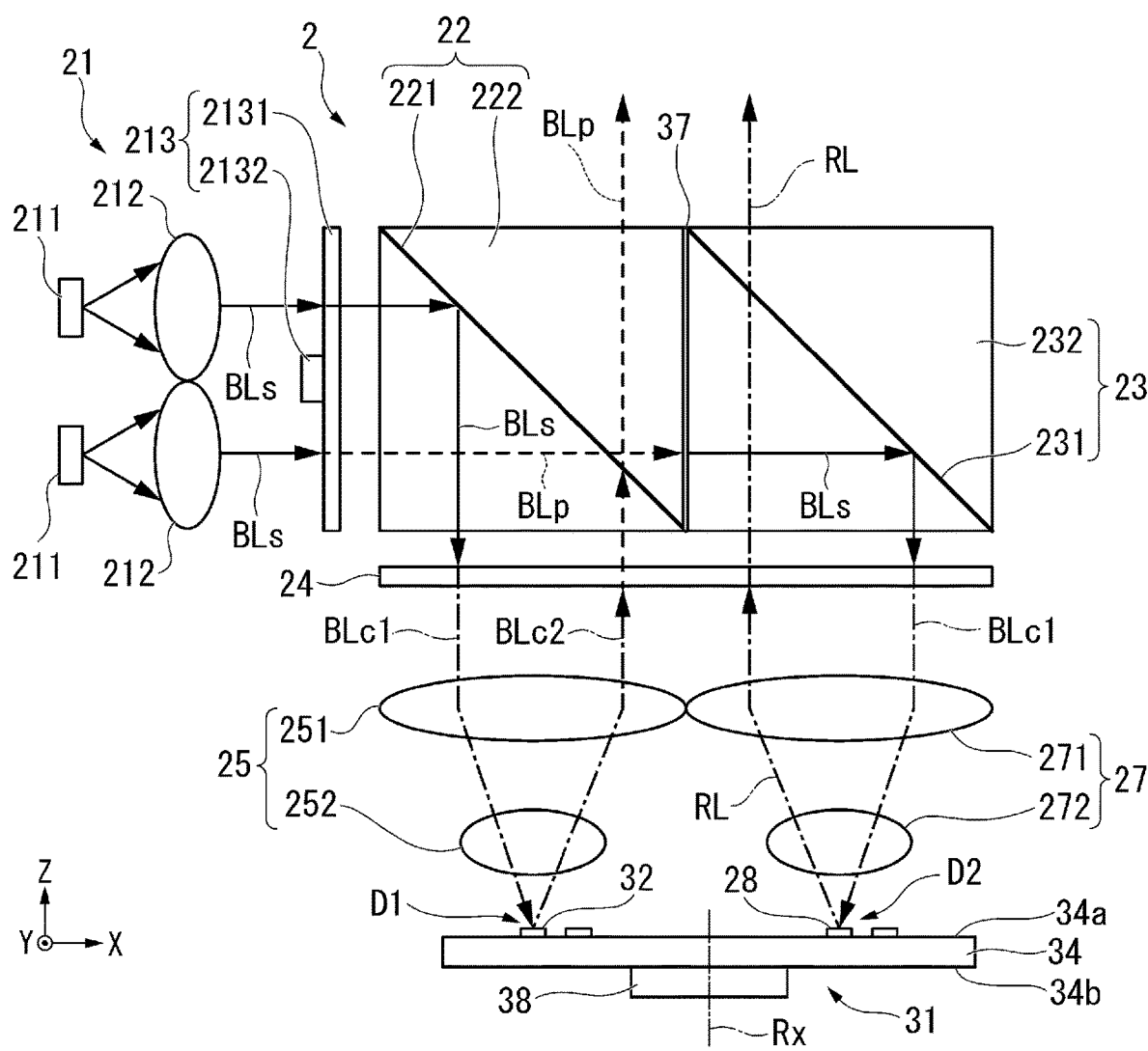
FIG. 3 is a plan view showing a configuration of an upper part of the light source device viewed from a +Y direction, and shows a behavior of light in a first period.
Figure 4:
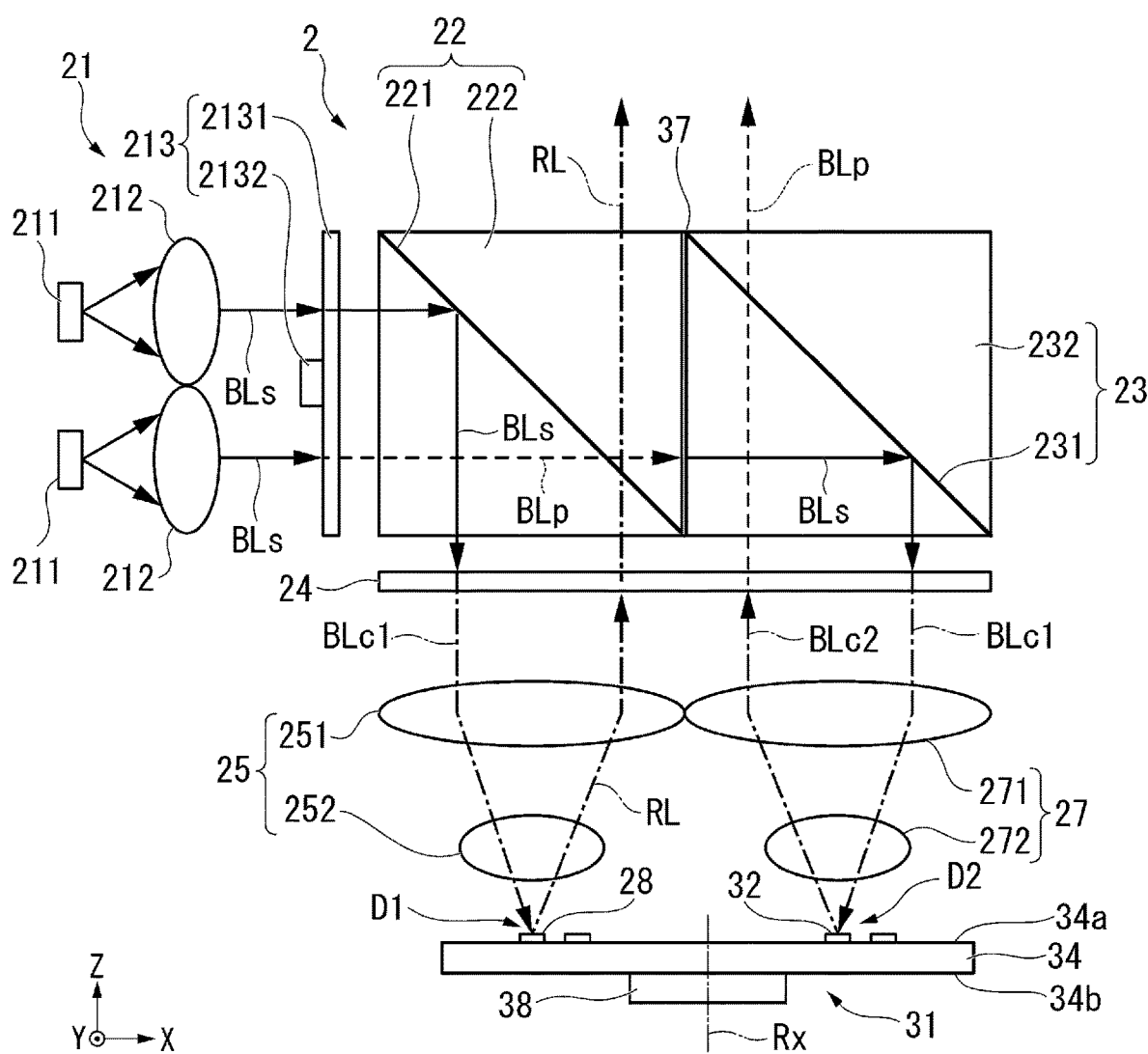
FIG. 4 is a plan view showing the configuration of the upper part of the light source device viewed from the +Y direction, and shows the behavior of the light in a second period.
Figure 5:
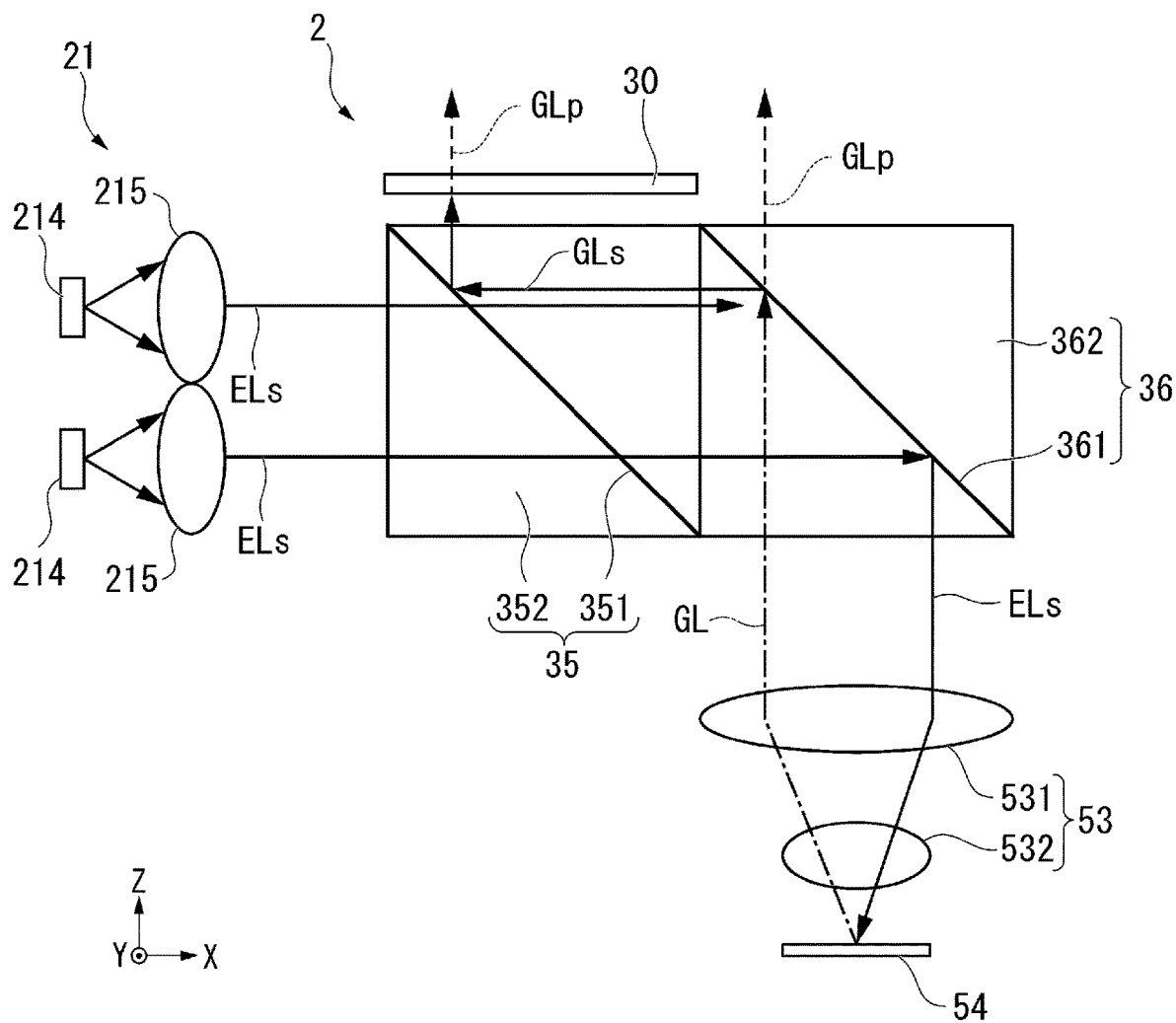
FIG. 5 is a plan view showing a configuration of a lower part of the light source device viewed from the +Y direction.

FIG. 2 is a perspective view of the light source device 2 according to the present embodiment. FIG. 3 is a plan view showing a configuration of an upper part of the light source device 2 viewed from the +Y direction, and shows a behavior of light in a first period. FIG. 4 is a plan view showing the configuration of the upper part of the light source device 2 viewed from the +Y direction, and shows the behavior of the light in a second period. FIG. 5 is a plan view showing a configuration of a lower part of the light source device 2 viewed from the +Y direction.

As shown in FIG. 1 and FIG. 2, the light source device 2 emits the light L for illuminating the light modulation device 6 toward a direction parallel to the illumination light axis Ax, namely the +Z direction. The light L emitted by the light source device 2 includes a plurality of colored light beams emitted from respective positions spatially separated from each other. In the present embodiment, the light L emitted by the light source device 2 consists of four light beams, namely a blue light beam BLp, a red light beam RL, a green light beam GLp, and a green light beam GLp.

P-polarized light in the present embodiment corresponds to light polarized in a first polarization direction in the appended claims. S-polarized light in the present embodiment corresponds to light polarized in a second polarization direction in the appended claims. Further, the P-polarized light in the present embodiment is the P-polarized light with respect to a first polarization split element 22, a second polarization split element 23, a first optical element 35, and a second optical element 36. The S-polarized light in the present embodiment is the S-polarized light with respect to the first polarization split element 22, the second polarization split element 23, the first optical element 35, and the second optical element 36.

It should be noted that in each of the drawings, the P-polarized light is represented by a dotted-line arrow, the S-polarized light is represented by a solid arrow, and light in other polarization states than the P-polarized light and the S-polarized light is represented by a dashed-dotted-line arrow.

The light source device 2 has a light source section 21, the first polarization split element 22, a first retardation element 37, the second polarization split element 23, a second retardation element 24, a first light collection element 25, a second light collection element 27, a light conversion device 31, the first optical element 35, the second optical element 36, a third light collection element 53, a second wavelength conversion element 54, and a fourth retardation element 30.

Configuration of Light Source Section

The light source section 21 emits blue light beams BLs, BLp which enter the first polarization split element 22, and an excitation light beam ELs which enters the first optical element 35 along the +X direction. The light source section 21 has a plurality of first light emitting elements 211, a plurality of first collimator lenses 212, a rotary retardation device 213, a plurality of second light emitting elements 214, and a plurality of second collimator lenses 215.

The first light emitting elements 211 are each formed of a solid-state light source for emitting the blue light beam BLs. Specifically, the first light emitting elements 211 are each formed of a semiconductor laser for emitting the blue light beam BLs as the S-polarized light. The blue light beam BLs is a laser beam having a blue wavelength band of, for example, 440 through 480 nm, and having a peak wavelength within a range of, for example, 450 through 460 nm.

As shown in FIG. 3 and FIG. 4, the plurality of first light emitting elements 211 is arranged at intervals along the Z axis. Although the light source section 21 in the present embodiment has the two light emitting elements 211, the number of the light emitting elements 211 is not limited, and the number of the light emitting elements 211 can be one. Further, the arrangement of the plurality of first light emitting elements 211 is not limited as well. Further, the first light emitting elements 211 are arranged so as to emit the blue light beams BLs as the S-polarized light, but can be arranged so as to emit the blue light beams as the P-polarized light since a light intensity ratio between the S-polarized light and the P-polarized light can arbitrarily be set by the rotary retardation device 213 described later. In other words, it is possible for the first light emitting elements 211 to rotate as much as 90° centering on the exit light axis from the posture shown in FIG. 3 and FIG. 4.

The plurality of first collimator lenses 212 is disposed between the plurality of first light emitting elements 211 and the rotary retardation device 213. The first collimator lenses 212 are disposed so as to correspond one-to-one to the first light emitting elements 211. The first collimator lens 212 collimates the light beam BLs emitted from the first light emitting element 211.

The rotary retardation device 213 has a third retardation element 2131, and a rotation device 2132. The third retardation element 2131 is made rotatable centering on a rotational axis along a proceeding direction of the light entering the third retardation element 2131, namely a rotational axis parallel to the X axis. The rotation device 2132 is formed of a motor and so on, and rotates the third retardation element 2131.

The third retardation element 2131 is formed of a ½ wave plate or a ¼ wave plate with respect to the blue wavelength band. A part of the blue light beam BLs as the S-polarized light having entered the third retardation element 2131 is converted into the blue light beam BLp as the P-polarized light by the third retardation element 2131. Therefore, the blue light having been transmitted through the third retardation element 2131 turns to light in which the blue light beam BLs as the S-polarized light and the blue light beam BLp as the P-polarized light are mixed with each other with a predetermined ratio. Specifically, the blue light beams BLs emitted from the first light emitting elements 211 enter the third retardation element 2131, and the third retardation element 2131 emits the blue light beam including the blue light beam BLs as the S-polarization component and the blue light beam BLp as the P-polarization component.

The blue light beam BLp as the P-polarized light in the present embodiment corresponds to a first light beam polarized in a first polarization direction in the appended claims. The blue light beam BLs as the S-polarized light in the present embodiment corresponds to the first light beam polarized in a second polarization direction in the appended claims.

By the rotation device 2132 adjusting the rotational angle of the third retardation element 2131, there is adjusted the ratio between the light intensity of the blue light beam BLs as the S-polarized light included in the light beam having been transmitted through the third retardation element 2131 and the light intensity of the blue light beam BLp as the P-polarized light included in the light beam having been transmitted through the third retardation element 2131. It should be noted that when there is no need to adjust the ratio between the light intensity of the blue light beam BLs and the light intensity of the blue light beam BLp, the rotary device 2132 for rotating the third retardation element 2131 is not required to be disposed. In that case, the rotational angle of the third retardation element 2131 is set so that the ratio between the light intensity of the blue light beam BLs and the light intensity of the blue light beam BLp becomes a predetermined light intensity ratio, and then the rotational position of the third retardation element 2131 is fixed.

In such a manner, the light source section 21 emits the blue light beam including the blue light beam BLs as the S-polarized light and the blue light beam BLp as the P-polarized light. It should be noted that in the present embodiment, there is adopted the configuration in which all of the first light emitting elements 211 emit the blue light beam BLs as the S-polarized light, but it is possible to adopt a configuration in which the first light emitting element 211 for emitting the blue light beam BLs as the S-polarized light and the first light emitting element 211 for emitting the blue light beam BLp as the P-polarized light are mixed. According to this configuration, it is also possible to omit the rotary retardation device 213. Further, it is also possible for the first light emitting element 211 to be formed of another solid-state light source such as an LED (Light Emitting Diode) instead of the semiconductor laser.

The second light emitting elements 214 are each formed of a solid-state light source for emitting the excitation light beam ELs. Specifically, the second light emitting elements 214 are each formed of a semiconductor laser for emitting the excitation light beam ELs as the S-polarized light. The excitation light beam ELs is a laser beam having an excitation wavelength band of, for example, 440 through 480 nm, and having a peak wavelength within a range of, for example, 450 through 460 nm. In the case of the present embodiment, the blue wavelength band of the first light emitting elements 211 and the excitation wavelength band of the second light emitting elements 214 are the same wavelength band. In this case, the same semiconductor laser can be used as the first light emitting elements 211 and the second light emitting elements 214. This makes the light source section 21 easy to manufacture. It should be noted that the blue wavelength band of the first light emitting elements 211 and the excitation wavelength band of the second light emitting elements 214 can be changed in accordance with the excitation wavelength of a phosphor included in each of a first wavelength conversion element 28 and the second wavelength conversion element 54, and can be different from each other.

As shown in FIG. 5, the plurality of second light emitting elements 214 is arranged at intervals along the Z axis. Although the light source section 21 in the present embodiment has the two second light emitting elements 214, the number of the second light emitting elements 214 is not limited, and the number of the second light emitting elements 214 can be one. Further, the arrangement of the plurality of second light emitting elements 214 is not limited as well. It should be noted that the number of the first light emitting element 211 and the number of the second light emitting elements 214 can be different from each other, and the arrangement of the first light emitting elements 211 and the arrangement of the second light emitting elements 214 can be different from each other.

The plurality of second collimator lenses 215 is disposed between the plurality of second light emitting elements 214 and the first optical element 35. The second collimator lenses 215 are disposed so as to correspond one-to-one to the second light emitting elements 214. The second collimator lens 215 collimates the light L emitted from the second light emitting element 214.

The excitation light beam ELs emitted from the second light emitting element 214 does not pass through the third retardation element 2131 unlike the first light emitting elements 211. Therefore, the excitation light beam ELs enters the first optical element 35 without changing the polarization state from that after being emitted from the second light emitting element 214. Although the excitation light ELs is the S-polarized light in the present embodiment, the polarization direction of the excitation light ELs is not limited. Further, it is also possible for the second light emitting element 214 to be formed of another solid-state light source such as an LED instead of the semiconductor laser.

Configuration of First Polarization Split Element

As shown in FIG. 3 and FIG. 4, the first polarization split element 22 is disposed at the +X direction side of the first light emitting elements 211 of the light source section 21. The blue light beam including the blue light beam BLs as the S-polarized light and the blue light beam BLp as the P-polarized light emitted from the light source section 21 enter the first polarization split element 22 along the +X direction. Further, the blue light beam BLp emitted from a diffusion element 32 of the light conversion device 31 and the red light beam RL emitted from the first wavelength conversion element 28 enter the first polarization split element 22 along the +Z direction.

The first polarization split element 22 has a first polarization split layer 221, and two first base members 222 disposed across the first polarization split layer 221. In other words, the first polarization split element 22 is formed of a prism type polarization split element. Specifically, each of the two first base members 222 has a substantially isosceles right triangular prismatic shape. The two first base members 222 are combined so that the tilted surfaces are opposed to each other, and are formed to have a substantially rectangular solid shape as a whole. The first polarization split layer 221 is disposed between the tilted surfaces of the two first base members 222. Therefore, the first polarization split layer 221 is tilted 45° with respect to the X axis and the Z axis. In other words, the first polarization split layer 221 is tilted 45° with respect to an X-Y plane and a Y-Z plane.

The first polarization split layer 221 has a polarization split characteristic of transmitting the P-polarized light and reflecting the S-polarized light with respect to the light in the blue wavelength band. Further, the first polarization split layer 221 has a characteristic of transmitting the light in the red wavelength band irrespective of the polarization state. Therefore, the first polarization split element 22 transmits the blue light beam BLp as the P-polarized light which enters the first polarization split element 22 along the +X direction from the light source section 21 toward the +X direction, and reflects the blue light beam BLs as the S-polarized light which enters the first polarization split element 22 along the +X direction from the light source section 21 toward the −Z direction crossing the +X direction. Further, the first polarization split element 22 transmits the blue light beam BLp as the P-polarized light which enters the first polarization split element 22 along the +Z direction from the diffusion element 32 toward the +Z direction, and reflects the red light beam RL which enters the first polarization split element 22 along the +Z direction from the first wavelength conversion element 28 toward the +Z direction.

It should be noted that the first polarization split element 22 can be constituted by a single base member, and an optical film disposed on one surface or two surfaces of the base member. In other words, the first polarization split element 22 can be formed of a plate type polarization split element.

Configuration of First Retardation Element

The first retardation element 37 is disposed at the +X direction side of the first polarization split element 22. In other words, the first retardation element 37 is disposed between the first polarization split element 22 and the second polarization split element 23 on the X axis. The first retardation element 37 is formed of a ½ wave plate with respect to the blue wavelength band which the blue light beam BLp entering the first retardation element 37 has. Therefore, the first retardation element 37 converts the blue light beam BLp as the P-polarized light emitted from the first polarization split element 22 into the blue light beam BLs as the S-polarized light. The blue light beam BLs which is emitted from the first polarization split element 22, and is converted into the S-polarized light by the first retardation element 37 enters the second polarization split element 23.

Configuration of Second Polarization Split Element

The second polarization split element 23 is disposed at the +X direction side of the first retardation element 37. The blue light beams BLs as the S-polarized light emitted from the first retardation element 37 enters the second polarization split element 23 along the +X direction. Further, the blue light beam BLp emitted from the diffusion element 32 of the light conversion device 31 and the red light beam RL emitted from the first wavelength conversion element 28 enter the second polarization split element 23 along the +Z direction.

The second polarization split element 23 has a second polarization split layer 231, and two second base members 232 disposed across the second polarization split layer 231. In other words, the second polarization split element 23 is formed of a prism type polarization split element. Specifically, each of the two second base members 232 has a substantially isosceles right triangular prismatic shape. The two second base members 232 are combined so that the tilted surfaces are opposed to each other, and are formed to have a substantially rectangular solid shape as a whole. The second polarization split layer 231 is disposed between the tilted surfaces of the two second base members 232. Therefore, the second polarization split layer 231 is tilted 45° with respect to the X axis and the Z axis. In other words, the second polarization split layer 231 is tilted 45° with respect to the X-Y plane and the Y-Z plane.

The second polarization split layer 231 has a polarization split characteristic of transmitting the P-polarized light and reflecting the S-polarized light with respect to the light in the blue wavelength band. Further, the second polarization split layer 231 has a characteristic of transmitting the light in the red wavelength band irrespective of the polarization state. In other words, the characteristic which the second polarization split layer 231 has, and the characteristic which the first polarization split layer 221 has are the same as each other. Therefore, the blue light beam BLs as the S-polarized light which enters the second polarization split element 23 along the +X direction from the first retardation element 37 is reflected by the second polarization split element 23 toward the −Z direction. Further, the second polarization split element 23 transmits the blue light beam BLp as the P-polarized light which enters the second polarization split element 23 along the +Z direction from the diffusion element 32 of the light conversion device 31 toward the +Z direction, and reflects the red light beam RL which enters the second polarization split element 23 along the +Z direction from the first wavelength conversion element 28 toward the +Z direction.

It should be noted that the second polarization split element 23 can be constituted by a single base member, and an optical film disposed on one surface or two surfaces of the base member. In other words, the second polarization split element 23 can be formed of a plate type polarization split element.

Configuration of Second Retardation Element

The second retardation element 24 is disposed at the −Z direction side of the first polarization split element 22 and the second polarization split element 23. In other words, the second retardation element 24 is disposed between the first polarization split element 22 and the substrate 34 of the light conversion device 31 on the X axis. Further, the second retardation element 24 is disposed between the second polarization split element 23 and the substrate 34 of the light conversion device 31 on the X axis. The second retardation element 24 in the present embodiment is disposed as an integrated member at the −Z direction side of the first polarization split element 22 and the second polarization split element 23, but can be formed of a member having a part located at the −Z direction side of the first polarization split element 22 and a part located at the −Z direction side of the second polarization split element 23 separated from each other.

The blue light beams BLs as the S-polarized light enter the second retardation element 24 along the −Z direction from the first polarization split element 22 and the second polarization split element 23. The second retardation element 24 is formed of a ¼ wave plate with respect to the blue wavelength band of the blue light beam BLs which enters the second retardation element 24. Therefore, the blue light beam BLs as the S-polarized light emitted from the first polarization split element 22 is converted by the second retardation element 24 into, for example, a blue light beam BLc1 as clockwise circularly polarized light, and is then emitted toward the first light collection element 25. Similarly, the blue light beam BLs as the S-polarized light emitted from the second polarization split element 23 is converted by the second retardation element 24 into, for example, the blue light beam BLc1 as clockwise circularly polarized light, and is then emitted toward the second light collection element 27. In such a manner, the blue light beam BLs as the S-polarized light enters the second retardation element 24 along the −Z direction from the first polarization split element 22 and the second polarization split element 23, and the second retardation element 24 converts the polarization state of the blue light beam BLs from the linearly polarized light into the circularly polarized light.

Configuration of First Light Collection Element

The first light collection element 25 is disposed at the −Z direction side of the first polarization split element 22 via the second retardation element 24. The first light collection element 25 converges the blue light beam BLc1 which enters the first light collection element 25 from the second retardation element 24 on the substrate 34 of the light conversion device 31. Further, the first light collection element 25 collimates a blue light beam BLc2 and the red light beam RL emitted from the light conversion device 31, and then emits the result toward the second retardation element 24. In the present embodiment, the first light collection element 25 is constituted by two convex lenses, namely a first lens 251 and a second lens 252. It should be noted that the number of the lenses constituting the first light collection element 25 is not particularly limited.

Configuration of Second Light Collection Element

The second light collection element 27 is disposed at the −Z direction side of the second polarization split element 23 via the second retardation element 24. The second light collection element 27 converges the blue light beam BLc1 which enters the second light collection element 27 from the second retardation element 24 on the substrate 34 of the light conversion device 31. Further, the second light collection element 27 collimates the blue light beam BLc2 and the red light beam RL emitted from the light conversion device 31, and then emits the result toward the second retardation element 24. In the present embodiment, the second light collection element 27 is constituted by two convex lenses, namely a first lens 271 and a second lens 272. It should be noted that the number of the lenses constituting the second light collection element 27 is not particularly limited.

Configuration of Light Conversion Device

The light conversion device 31 is disposed at the −Z direction side of the first light collection element 25 and the second light collection element 27. The light conversion device 31 has the substrate 34, a rotation device 38, the diffusion elements 32, and the first wavelength conversion elements 28.

The substrate 34 is formed of a plane member shaped like a circle viewed from the +Z direction, and has a first surface 34a opposed to the first light collection element 25 and the second light collection element 27, and a second surface 34b different from the first surface 34a. The rotation device 38 is constituted by a motor and so on, and rotates the substrate 34 centering on a rotational axis Rx along a proceeding direction of the blue light beam BLc1 which enters the substrate 34.

Figure 6:
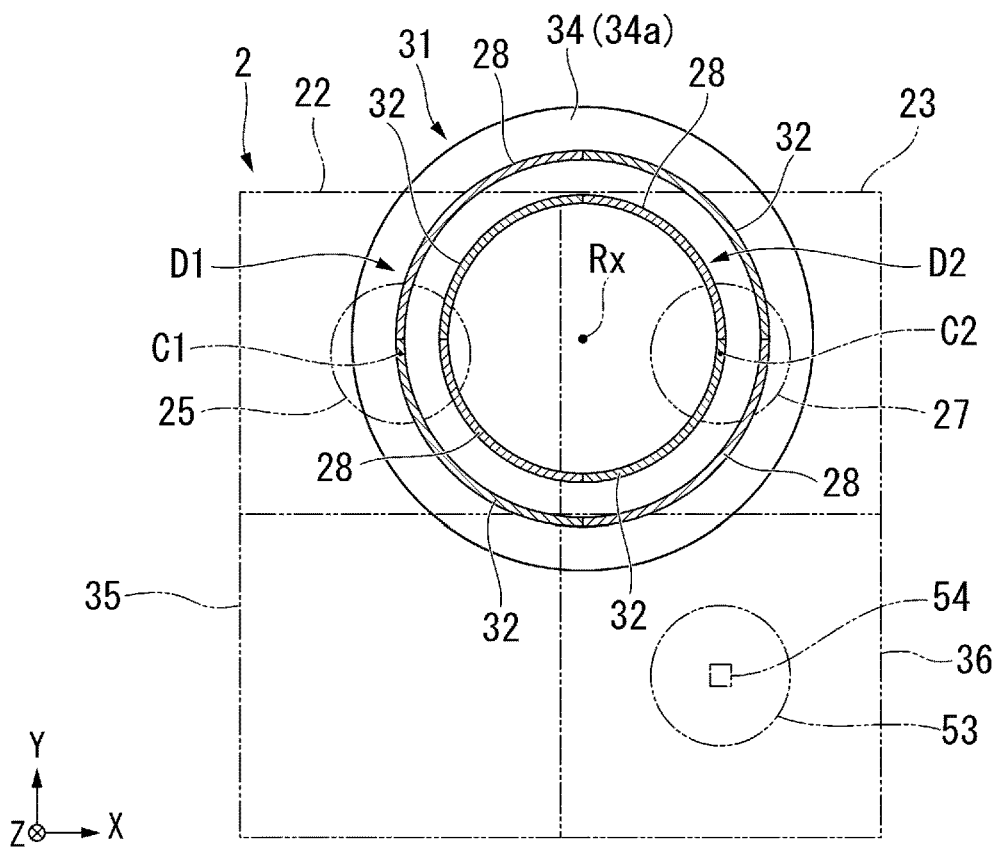
FIG. 6 is a front view of a light conversion device viewed from a −Z direction.

FIG. 6 is a front view of the light conversion device 31 viewed from the −Z direction. It should be noted that in FIG. 6, the diffusion elements 32 and the first wavelength conversion elements 28 are actually hidden behind the substrate 34 when viewing the light conversion device 31 from the −Z direction, but are drawn with the solid lines in order to make the drawing eye-friendly.

As shown in FIG. 6, the rotational axis Rx of the substrate 34 is disposed on a straight line connecting an optical axis C1 of the first light collection element 25 and an optical axis C2 of the second light collection element 27. In the first surface 34a of the substrate 34, an area shaped like a ring at a predetermined distance from the rotational axis Rx in a radial direction centering on the rotational axis Rx is defined as a first annular area D1, and an area shaped like a ring located inward in the radial direction from the first annular area D1 is defined as a second annular area D2. In other words, the first annular area D1 and the second annular area D2 are concentric circles centering on the rotational axis Rx. Further, in the radial direction centering on the rotational axis Rx, the distance of the first annular area D1 from the rotational axis Rx is longer than the distance of the second annular area D2 from the rotational axis Rx. In other words, in a plan view viewed from the −Z direction, the second annular area D2 is disposed at the inner side of the first annular area D1 throughout the entire circumference centering on the rotational axis Rx.

The first annular area D1 is a ring-like area which passes through the optical axis C1 of the first light collection element 25, and is irradiated with the blue light beam BLc1 emitted from the first polarization split element 22 and entering the substrate 34 via the second retardation element 24 and the first light collection element 25 when the substrate 34 rotates. The second annular area D2 is a ring-like area which passes through the optical axis C2 of the second light collection element 27, and is irradiated with the blue light beam BLc1 emitted from the second polarization split element 23 and entering the substrate 34 via the second retardation element 24 and the second light collection element 27 when the substrate 34 rotates.

In the first annular area D1, the diffusion elements 32 and the first wavelength conversion elements 28 are alternately disposed. In the case of the present embodiment, the first annular area D1 is divided into four divisional areas having predetermined central angles centering on the rotational axis Rx, and the diffusion elements 32 and the first wavelength conversion elements 28 are disposed alternately in the four divisional areas. Similarly, the second annular area D2 is divided into four divisional areas having predetermined central angles centering on the rotational axis Rx, and the diffusion elements 32 and the first wavelength conversion elements 28 are disposed alternately in the four divisional areas.

Further, in the radial direction centering on the rotational axis Rx, the first wavelength conversion elements 28 of the second annular area D2 are disposed at the inner side in the radial direction of the diffusion elements 32 of the first annular area D1. The diffusion elements 32 of the second annular area D2 are disposed at the inner side in the radial direction of the first wavelength conversion elements 28 of the first annular area D1. In other words, in the first annular area D1 and the second annular area D2, the diffusion elements 32 and the first wavelength conversion elements 28 are arranged in a staggered manner. It should be noted that although each of the first annular area D1 and the second annular area D2 is divided into the four divisional areas in the present embodiment, the division number of each of the first annular area D1 and the second annular area D2 is not limited to four, and can arbitrarily be changed.

Due to this configuration, the blue light beam BLc1 emitted from the first polarization split element 22 temporally alternately enters the diffusion element 32 and the first wavelength conversion element 28 in the first annular area D1. The blue light beam BLc1 emitted from the second polarization split element 23 temporally alternately enters the first wavelength conversion element 28 and the diffusion element 32 in the second annular area D2.

Specifically, as shown in FIG. 3, in a first period in which the blue light beam BLc1 emitted from the first polarization split element 22 enters the diffusion element 32 in the first annular area D1, the blue light beam BLc1 emitted from the second polarization split element 23 enters the first wavelength conversion element 28 in the second annular area D2. Further, as shown in FIG. 4, in a second period in which the blue light beam BLc1 emitted from the first polarization split element 22 enters the first wavelength conversion element 28 in the first annular area D1, the blue light beam BLc1 emitted from the second polarization split element 23 enters the diffusion element 32 in the second annular area D2.

The diffusion elements 32 each diffuse the blue light beam BLc1 which enters the diffusion element 32 along the −Z direction from the first polarization split element 22 and the second polarization split element 23 so that the diffusion angle becomes equivalent to that of the red light beam RL emitted from the first wavelength conversion element 28, and then emit the blue light beam BLc2 toward the +Z direction. The diffusion elements 32 are each formed of, for example, a metal layer having a concavo-convex structure formed on the surface of the metal layer, or a light transmissive layer including a scattering material such as bubbles inside.

The diffusion element 32 preferably has a reflection characteristic as close to the Lambertian scattering as possible, and reflects the blue light beam BLc1 having entered the diffusion element 32 in a wide-angle manner. The blue light beam BLc1 having entered the diffusion element 32 is reflected by the diffusion element 32 to thereby be converted into the blue light beam BLc2 as the circularly polarized light having an opposite rotational direction. In other words, the blue light beam BLc1 as the clockwise circularly polarized light is converted by the diffusion element 32 into the blue light beam BLc2 as counterclockwise circularly polarized light.

As shown in FIG. 3, in the first period, the blue light beam BLc2 emitted from the diffusion element 32 in the first annular area D1 is collimated by passing through the first light collection element 25 toward the +Z direction, and then enters the second retardation element 24. On this occasion, the blue light beam BLc2 which enters the second retardation element 24 from the first light collection element 25 is converted by the second retardation element 24 into the blue light beam BLp as the P-polarized light. The blue light beam BLp as the P-polarized light is transmitted through the first polarization split element 22 toward the +Z direction, and is then emitted from the first polarization split element 22.

Further, as shown in FIG. 4, in the second period, the blue light beam BLc2 emitted from the diffusion element 32 in the second annular area D2 is collimated by passing through the second light collection element 27 toward the +Z direction, and then enters the second retardation element 24. On this occasion, the blue light beam BLc2 which enters the second retardation element 24 from the second light collection element 27 is converted by the second retardation element 24 into the blue light beam BLp as the P-polarized light. The blue light beam BLp as the P-polarized light is transmitted through the second polarization split element 23 toward the +Z direction, and is then emitted from the second polarization split element 23.

The first wavelength conversion element 28 is a reflective wavelength conversion element which is excited by the blue light beam BLc1 entering the first wavelength conversion element 28, and emits the red light beam RL having a different wavelength band from the wavelength band of the blue light beam BLc1 having entered the first wavelength conversion element 28 toward an opposite direction to the incident direction of the light. In other words, the first wavelength conversion element 28 performs the wavelength conversion on the light which enters the first wavelength conversion element 28, and then emits the light on which the wavelength conversion has been performed toward the opposite direction to the incident direction of the light.

The red light beam RL in the present embodiment corresponds to a second light beam having a second wavelength band in the appended claims.

In the present embodiment, the first wavelength conversion element 28 includes a red phosphor which is excited by blue light and emits red light. As the red phosphor, there is used, for example, the YAG phosphor (any one of Pr:YAG, Eu:YAG, and Cr:YAG) made of $(Y1-x,Gdx)_3(Al,Ga)_5O_{12}$ having any one of Pr, Eu, and Cr dispersed as an activator agent. It should be noted that it is possible for the activator agent to include a species selected from Pr, Eu, and Cr, or to be a coactivation type activator agent including two or more species selected from Pr, Eu, and Cr. The red light beam RL is light as unpolarized light having a wavelength band including a peak wavelength in a range of, for example, 600 through 800 nm.

As shown in FIG. 3, in the first period, the red light beam RL emitted from the first wavelength conversion element 28 in the second annular area D2 is collimated by passing through the second light collection element 27 along the +Z direction, and is then transmitted through the second retardation element 24 to enter the second polarization split element 23. The red light beam RL entering the second polarization split element 23 along the +Z direction is transmitted through the second polarization split element 23 toward the +Z direction.

Further, as shown in FIG. 4, in the second period, the red light beam RL emitted from the first wavelength conversion element 28 in the first annular area D1 is transmitted through the first light collection element 25 along the +Z direction to thereby be collimated, and is then transmitted through the second retardation element 24 to enter the first polarization split element 22. The red light beam RL entering the first polarization split element 22 along the +Z direction is transmitted through the first polarization split element 22 toward the +Z direction. It should be noted that in either of FIG. 3 and FIG. 4, since the red light beam RL is the unpolarized light, there is no chance for the state of the unpolarized light to change when being transmitted through the second retardation element 24.

In other words, in the first period, the blue light beam BLp is emitted from the first polarization split element 22 toward the +Z direction, and the red light beam RL is emitted from the second polarization split element 23 toward the +Z direction. In the second period, the red light beam RL is emitted from the first polarization split element 22 toward the +Z direction, and the blue light beam BLp is emitted from the second polarization split element 23 toward the +Z direction. In the case of the present embodiment, the length of each of the first period and the second period is ¼ as long as the time which the substrate 34 shown in FIG. 6 takes to rotate one revolution. Further, the first period and the second period are temporally alternately repeated during the period in which the substrate 34 is rotating. In such a manner, the blue light beam BLp and the red light beam RL are emitted from the first polarization split element 22 and the second polarization split element 23 while being alternately replaced with each other.

Configuration of First Optical Element

As shown in FIG. 5, the first optical element 35 is disposed at the +X direction side of the second light emitting elements 214 of the light source section 21. Further, as shown in FIG. 2, the first optical element 35 is disposed at the −Y direction side of the first polarization split element 22. The excitation light beams ELs emitted from the second light emitting elements 214 enter the first optical element 35 along the +X direction. Further, the green light beam GLs as the S-polarized light emitted from the second optical element 36 enters the first optical element 35 along the −X direction.

The first optical element 35 has a first optical layer 351, and two third base members 352 disposed across the first optical layer 351. In other words, the first optical element 35 is formed of a prism type optical element. Specifically, each of the two third base members 352 has a substantially isosceles right triangular prismatic shape. The two third base members 352 are combined so that the tilted surfaces are opposed to each other, and are formed to have a substantially rectangular solid shape as a whole. The first optical layer 351 is disposed between the tilted surfaces of the two third base members 352. Therefore, the first optical layer 351 is tilted 45° with respect to the X axis and the Z axis. In other words, the first optical layer 351 is tilted 45° with respect to the X-Y plane and the Y-Z plane.

The first optical layer 351 has a characteristic of transmitting the light in the blue wavelength band irrespective of the polarization direction, and reflecting at least the S-polarized light with respect to the light in the green wavelength band. Therefore, the first optical layer 351 can be formed of a dichroic mirror which transmits the light in the blue wavelength band and reflects the light in the green wavelength band. Therefore, the first optical element 35 transmits the excitation light beam ELs which enters the first optical element 35 along the +X direction from the light source section 21 toward the +X direction, and reflects the green light beam GLs as the S-polarized light which enters the first optical element 35 along the −X direction from the second optical element toward the +Z direction.

It should be noted that the first optical element 35 can be constituted by a single base member, and an optical film disposed on one surface or two surfaces of the base member. Specifically, the first optical element can be formed of a plate type optical element.

Configuration of Second Optical Element

As shown in FIG. 5, the second optical element 36 is disposed at the +X direction side of the first optical element 35. Further, as shown in FIG. 2, the second optical element 36 is disposed at the −Y direction side of the second polarization split element 23. The excitation light beams ELs emitted from the first optical element 35 enter the second optical element 36 along the +X direction. Further, the green light beam GL emitted from the second wavelength conversion element 54 enters the second optical element 36 along the +Z direction.

The second optical element 36 has a second optical layer 361, and two fourth base members 362 disposed across the second optical layer 361. In other words, the second optical element 36 is formed of a prism type optical element. Specifically, each of the two fourth base members 362 has a substantially isosceles right triangular prismatic shape. The two fourth base members 362 are combined so that the tilted surfaces are opposed to each other, and are formed to have a substantially rectangular solid shape as a whole. The second optical layer 361 is disposed between the tilted surfaces of the two fourth base members 362. Therefore, the second optical layer 361 is tilted 45° with respect to the X axis and the Z axis. In other words, the second optical layer 361 is tilted 45° with respect to the X-Y plane and the Y-Z plane.

The second optical layer 361 has a polarization split characteristic of reflecting at least the S-polarized light with respect to the light in the blue wavelength band, and transmitting the P-polarized light while reflecting the S-polarized light with respect to the light in the green wavelength band. Therefore, the second optical element 36 reflects the excitation light beams ELs which enter the second optical element 36 along the +X direction from the first optical element 35 toward the −Z direction, and transmits the green light beam GLp as the P-polarized light and transmits the green light beam GLs as the S-polarized light toward the −X direction out of the green light beam GL which enters the second optical element 36 along the +Z direction from the second wavelength conversion element 54 toward the −X direction.

The green light beam GLp as the P-polarized light in the present embodiment corresponds to a third light beam polarized in the first polarization direction. The green light beam GLs as the S-polarized light in the present embodiment corresponds to the third light beam polarized in the second polarization direction.

It should be noted that the second optical element 36 can be constituted by a single base member, and an optical film disposed on one surface or two surfaces of the base member. Specifically, the second optical element can be formed of a plate type optical element.

Configuration of Third Light Collection Element

The third light collection element 53 is disposed at the −Z direction side of the second optical element 36. The third light collection element 53 converges the excitation light beam ELs which enters the third light collection element 53 from the second optical element 36 on the second wavelength conversion element 54. Further, the third light collection element 53 collimates the green light beam GL which is emitted from the second wavelength conversion element 54, and then emits the result toward the second optical element 36. In the present embodiment, the third light collection element 53 is constituted by two convex lenses, namely a first lens 531 and a second lens 532. It should be noted that the number of the lenses constituting the third light collection element 53 is not particularly limited.

Configuration of Second Wavelength Conversion Element

The second wavelength conversion element 54 is disposed at the −Z direction side of the third light collection element 53. In other words, the second wavelength conversion element 54 is disposed at the −Z direction side of the second optical element 36. The second wavelength conversion element 54 is formed of a reflective wavelength conversion element which is excited by the excitation light beam ELs entering the second wavelength conversion element 54, and emits the light different in wavelength band from the excitation light beam ELs toward an opposite direction to the incident direction of the excitation light beam ELs. In other words, the second wavelength conversion element 54 performs the wavelength conversion on the excitation light beam ELs which enters the second wavelength conversion element 54, and then emits the green light beam GL on which the wavelength conversion has been performed toward the opposite direction to the incident direction of the excitation light beam ELs.

The second wavelength conversion element 54 includes a green phosphor which is excited by the light having the blue wavelength band to emit green light. Specifically, the second wavelength conversion element 54 includes a phosphor material such as a $Lu_3Al_5O_{12}:Ce^{3+}$ phosphor, a $Y_3O_4:Eu^{2+}$ phosphor, a $(Ba,Sr)_2SiO_4:Eu^{2+}$ phosphor, a $Ba_3Si_6O_{12}N_2:Eu^{2+}$ phosphor, or a $(Si,Al)_6(o,N)_8:Eu^{2+}$ phosphor. The green light beam GL emitted from the second wavelength conversion element 54 is green light as unpolarized light having a peak wavelength within a range of, for example, 500 through 570 nm.

The green light beam GL in the present embodiment corresponds to the third light beam having a third wavelength band in the appended claims.

The green light beam GL emitted from the second wavelength conversion element 54 is transmitted through the third light collection element 53 along the +Z direction to thereby be collimated, and then enters the second optical element 36. Although a stationary wavelength conversion element is used as the second wavelength conversion element 54 in the present embodiment, instead of this configuration, it is possible to use a rotary wavelength conversion element provided with a rotation device for rotating the second wavelength conversion element 54 centering on a rotational axis parallel to the Z axis. In this case, a rise in temperature of the second wavelength conversion element 54 is suppressed, and thus, it is possible to increase the wavelength conversion efficiency.

As described above, the second optical layer 361 of the second optical element 36 has a polarization split characteristic with respect to the light in the green wavelength band. Therefore, out of the green light beam GL as the unpolarized light having entered the second optical element 36, the green light beam GLs as the S-polarized light is reflected by the second optical layer 361 toward the −X direction, and then enters the first optical element 35. As described above, the first optical layer 351 of the first optical element 35 has a characteristic of reflecting at least the S-polarized light with respect to the light in the green wavelength band. Therefore, the green light beam GLs having entered the first optical element 35 along the −X direction is reflected by the first optical layer 351 toward the +Z direction, and is then emitted from the first optical element 35.

Meanwhile, out of the green light beam GL as the unpolarized light having entered the second optical element 36, the green light beam GLp as the P-polarized light is transmitted through the second optical layer 361 toward the +Z direction, and is then emitted from the second optical element 36.

Configuration of Fourth Retardation Element

The fourth retardation element 30 is disposed at the +Z direction side of the first optical element 35. In other words, the fourth retardation element 30 is disposed on the light path of the green light beam GLs emitted from the first optical element 35. The fourth retardation element 30 is formed of a ½ wave plate with respect to the green wavelength band which the green light beam GLs has. The fourth retardation element 30 converts the green light beam GLs as the S-polarized light emitted from the first optical element 35 into the green light beam GLp as the P-polarized light. The green light beam GLp which is converted by the fourth retardation element 30 into the P-polarized light is emitted from the light source device 2 toward the +Z direction.

Due to the configuration described above, in the light source device 2 according to the present embodiment, the four colored light beams consisting of the red light beam RL, the blue light beam BLp, the green light beam GLp, and the green light beam GLp are spatially separated from each other to be emitted from the respective positions different from each other, and then enter the homogenization device 4. Specifically, as shown in FIG. 3 and FIG. 4, in the X-Y plane, the red light beam RL is temporally alternately emitted from the position at the −X direction side and at the +Y direction side, or the position at the +X direction side and at the +Y direction side. The blue light beam BLp is temporally alternately emitted from the position at the +X direction side and at the +Y direction side, or the position at the −X direction side and at the +Y direction side. As shown in FIG. 5, the two green light beams GLp are always emitted from the position at the −X direction side and at the −Y direction side, and the position at the +X direction side and at the −Y direction side, respectively.

Configuration of Homogenization Device

As shown in FIG. 1, the homogenization device 4 homogenizes the illuminance in the image formation area of the light modulation device 6 irradiated with the light beams emitted from the light source device 2. The homogenization device 4 has a first multi-lens 41, a second multi-lens 42, and a superimposing lens 43.

The first multi-lens 41 has a plurality of lenses 411 arranged in a matrix in a plane perpendicular to a central axis of the light L entering the first multi-lens 41 from the light source device 2, namely the illumination light axis Ax. The first multi-lens 41 divides the light entering the first multi-lens 41 from the light source device 2 into a plurality of partial light beams with the plurality of lenses 411.

Figure 7:
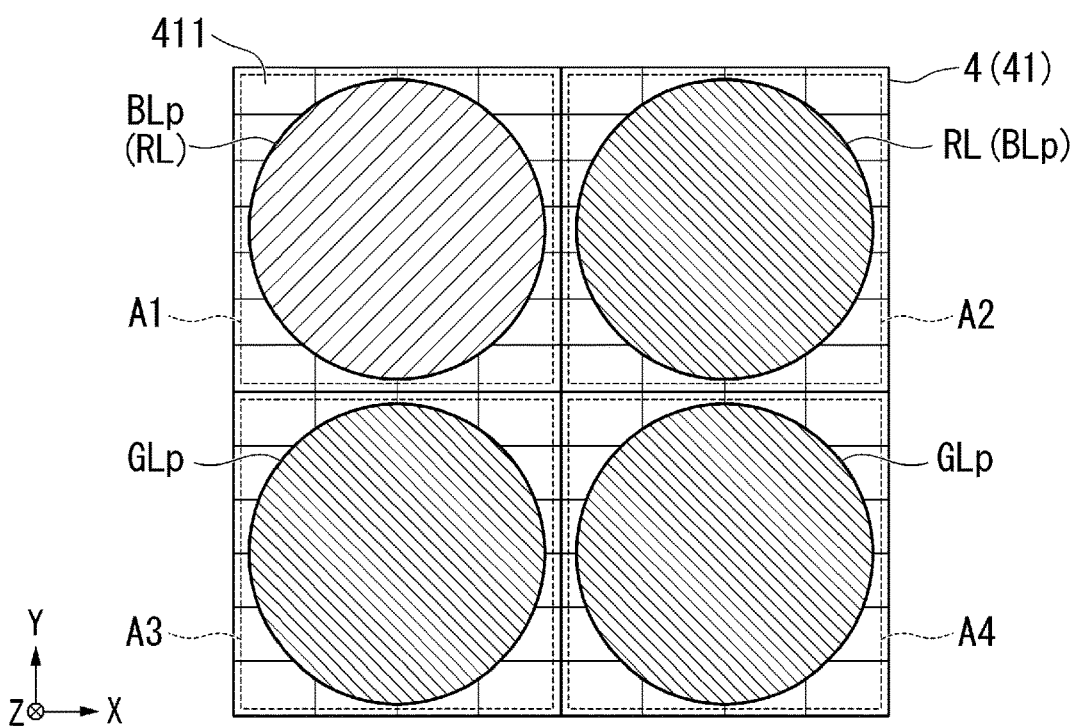
FIG. 7 is a schematic diagram showing positions of incidence of colored light beams on a multi-lens.

FIG. 7 is a schematic diagram showing positions of incidence of the respective colored light beams in the first multi-lens 41 viewed from the −Z direction.

As shown in FIG. 7, the blue light beam BLp, the red light beam RL, the green light beam GLp, and the green light beam GLp emitted from the light source device 2 enter the first multi-lens 41. In the first period, the blue light beam BLp emitted from the position at the −X direction side and at the +Y direction side in the light source device 2 enters the plurality of lenses 411 included in an area A1 located at the −X direction side and at the +Y direction side in the first multi-lens 41. Further, in the first period, the red light beam RL emitted from the position at the +X direction side and at the +Y direction side in the light source device 2 enters the plurality of lenses 411 included in an area A2 located at the +X direction side and at the +Y direction side in the first multi-lens 41. In the second period, the position of incidence of the blue light beam BLp and the position of incidence of the red light beam RL are flipped from the positions of incidence in the first period described above.

Further, the green light beam GLp emitted from the position at the −X direction side and at the −Y direction side in the light source device 2 enters the plurality of lenses 411 included in an area A3 located at the −X direction side and at the −Y direction side in the first multi-lens 41. The green light beam GLp emitted from the position at the +X direction side and at the −Y direction side in the light source device 2 enters the plurality of lenses 411 included in an area A4 located at the +X direction side and at the −Y direction side in the first multi-lens 41. Each of the colored light beams having entered the lenses 411 is converted into a plurality of partial light beams, and enters lenses 421 corresponding respectively to the lenses 411 in the second multi-lens 42.

As shown in FIG. 1, the second multi-lens 42 has the plurality of lenses 421 which is arranged in a matrix in a plane perpendicular to the illumination light axis Ax, and at the same time, corresponds respectively to the plurality of lenses 411 of the first multi-lens 41. The partial light beams emitted from the lenses 411 opposed respectively to the lenses 421 enter the respective lenses 421. Each of the lenses 421 makes the partial light beam enter the superimposing lens 43.

The superimposing lens 43 superimposes the plurality of partial light beams entering the superimposing lens 43 from the second multi-lens 42 on each other in the image formation area of the light modulation device 6. In particular, the second multi-lens 42 and the superimposing lens 43 make the blue light beam BLp, the red light beam RL, the green light beam GLp, and the green light beam GLp each divided into the plurality of partial light beams enter a plurality of microlenses 621 constituting a microlens array 62 described later of the light modulation device 6 at respective angles different from each other via the field lens 5.

Further, the polarization conversion element 8 is disposed between the second multi-lens 42 and the superimposing lens 43. The polarization split element 8 is disposed at the +Y direction side of the illumination optical axis Ax. In other words, the polarization conversion element 8 is disposed on the light path of the blue light beam BLp and the red light beam RL out of the blue light beam BLp, the red light beam RL, the green light beam GLp, and the green light beam GLp emitted from the light source device 2. Out of the four light beams emitted from the light source device 2, the three light beams except the red light beam RL are the P-polarized light, and the red light beam RL is the unpolarized light. Therefore, by disposing the polarization conversion element 8 on the light path of the blue light beam BLp and the red light beam RL, it is possible to uniform the polarization direction of the red light beam RL into the P-polarized light the same as the polarization direction of the rest of the colored light beams.

Configuration of Light Modulation Device

As shown in FIG. 1, the light modulation device 6 modulates the light beams emitted from the light source device 2. In particular, the light modulation device 6 modulates each of the colored light beams which are emitted from the light source device 2, and then enter the light modulation device 6 via the homogenization device 4 and the field lens 5 in accordance with image information to form the image light corresponding to the image information. The light modulation device 6 is provided with the single liquid crystal panel 61 and the single microlens array 62.

Configuration of Liquid Crystal Panel

Figure 8:
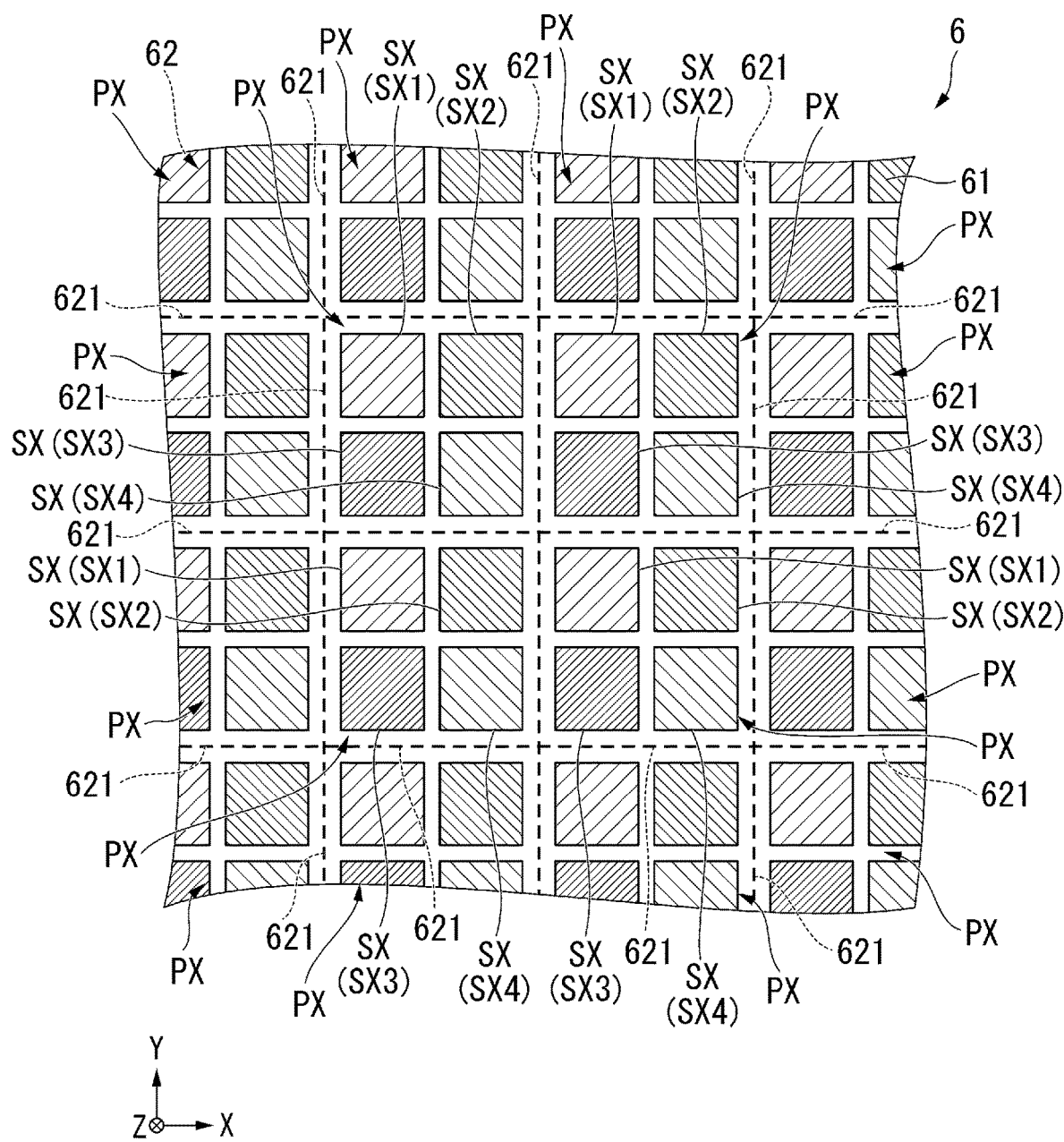
FIG. 8 is an enlarged view of a light modulation device.

FIG. 8 is a schematic enlarged view of a part of the light modulation device 6 viewed from the −Z direction. In other words, FIG. 8 shows a correspondence relationship between the pixels PX provided to the liquid crystal panel 61 and the microlenses 621 provided to the microlens array 62.

As shown in FIG. 8, the liquid crystal panel 61 has the plurality of pixels PX arranged in a matrix in a plane perpendicular to the illumination light axis Ax (the Z axis).

One pixel PX has a plurality of sub-pixels SX for respectively modulating colored light beams different in color from each other. In the present embodiment, each of the pixels PX has four sub-pixels SX (SX1 through SX4). Specifically, in one pixel PX, the first sub-pixel SX1 is disposed at a position at the −X direction side and at the +Y direction side. The second sub-pixel SX2 is disposed at a position at the −X direction side and at the −Y direction side. The third sub-pixel SX3 is disposed at a position at the +X direction side and at the +Y direction side. The fourth sub-pixel SX4 is disposed at a position at the +X direction side and at the −Y direction side.

Configuration of Microlens Array

As shown in FIG. 1, the microlens array 62 is disposed at the −Z direction side as the side of incidence of light with respect to the liquid crystal panel 61. The microlens array 62 guides the plurality of colored light beams entering the microlens array 62 to the individual pixels PX. The microlens array 62 has the plurality of microlenses 621 corresponding to the plurality of pixels PX.

As shown in FIG. 8, the plurality of microlenses 621 is arranged in a matrix in a plane perpendicular to the illumination light axis Ax. In other words, the plurality of microlenses 621 is arranged in a matrix in an orthogonal plane with respect to the central axis of the light entering the plurality of microlenses 621 from the field lens 5. In the present embodiment, one microlens 621 is disposed so as to correspond to the two sub-pixels arranged in the +X direction and the two sub-pixels arranged in the +Y direction. In other words, one microlens 621 is disposed so as to correspond to the four sub-pixels SX1 through SX4 arranged 2(2 in the X-Y plane.

The blue light beam BLp, the red light beam RLp, the green light beam GLp, and the green light beam GLp each superimposed by the homogenization device 4 enter the microlenses 621 at respective angles different from each other. The microlenses 621 make the colored light beams entering the microlens 621 enter the sub-pixels SX corresponding to the colored light beams.

Specifically, in the first period, the microlens 621 makes the blue light beam BLp enter the first sub-pixel SX1 out of the four sub-pixels SX of the pixel PX corresponding to the microlens 621, makes the red light beam RLp enter the second sub-pixel SX2, makes the green light beam GLp enter the third sub-pixel SX3, and makes the green light beam GLp enter the fourth sub-pixel SX4. Specifically, in the second period, the microlens 621 makes the red light beam RLp enter the first sub-pixel SX1 out of the four sub-pixels SX of the pixel PX corresponding to the microlens 621, makes the blue light beam BLp enter the second sub-pixel SX2, makes the green light beam GLp enter the third sub-pixel SX3, and makes the green light beam GLp enter the fourth sub-pixel SX4.

Thus, the colored light beams corresponding respectively to the sub-pixels SX1 through SX4 enter the respective sub-pixels SX1 through SX4, and the colored light beams are respectively modulated by the corresponding sub-pixels SX1 through SX4. On this occasion, due to the light conversion device 31, the first period in which the blue light beam BLp enters the first sub-pixel SX1 and the red light beam RLp enters the second sub-pixel SX2, and the second period in which the blue light beam BLp enters the second sub-pixel SX2 and the red light beam RLp enters the first sub-pixel SX1 are temporally switched. In such a manner, the image light modulated by the liquid crystal panel 61 is projected by the projection optical device 7 on the projection target surface such as a screen not shown.

It should be noted that in the projector 1 according to the present embodiment, since the light beams which respectively enter the first sub-pixel SX1 and the second sub-pixel SX2 are temporally interchanged, the image signals to respectively be supplied to the first sub-pixel SX1 and the second sub-pixel SX2 are interchanged in tandem with the interchange of the light beams which respectively enter the first sub-pixel SX1 and the second sub-pixel SX2.

Advantages of First Embodiment

In the related-art projector described in Document 1, the lamp is used as the light source. Since the light emitted from the lamp is not uniform in polarization direction, in order to use the liquid crystal panel as the light modulation device, a polarization conversion device for uniforming the polarization direction becomes necessary. For the projector, there is generally used the polarization conversion device provided with a multi-lens array and a polarization split element (PBS) array. However, in order to reduce the size of the projector, there are required the multi-lens array and the PBS array narrow in pitch, but it is extremely difficult to manufacture the PBS array narrow in pitch.

To cope with this problem, the light source device 2 according to the present embodiment is provided with the light source section 21 which emits the light beam including the blue light beam BLp as the P-polarized light and the blue light beam BLs as the S-polarized light, the first polarization split element 22 which transmits the blue light beam BLp as the P-polarized light entering the first polarization split element 22 along the +X direction from the light source section 21 toward the +X direction, and reflects the blue light beam BLs as the S-polarized light toward the −Z direction, the first retardation element 37 which is disposed at the +X direction side of the first polarization split element 22, and converts the blue light beam BLp as the P-polarized light entering the first retardation element 37 along the +X direction from the first polarization split element 22 into the blue light beam BLs as the S-polarized light, the second polarization split element 23 which is disposed at the +X direction side of the first retardation element 37, and reflects the blue light beam BLs as the S-polarized light entering the second polarization split element 23 along the +X direction from the first reflecting element 37 toward the −Z direction, the second retardation element 24 which the blue light beams BLs as the S-polarized light enter along the −Z direction from the first polarization split element 22 and the second polarization split element 23, and the light conversion device 31 having the diffusion elements 32 which diffuses the blue light beam BLc1 entering the diffusion elements 32 along the −Z direction from the second retardation element 24 to emit the result toward the +Z direction, the first wavelength conversion elements 28 which performs the wavelength conversion on the blue light beam BLc1 entering the first wavelength conversion elements 28 along the −Z direction from the second retardation element 24 to emit the red light beam RL having the red wavelength band different from the blue wavelength band toward the +Z direction, and the substrate 34 which rotates around the rotational axis Rx along the proceeding direction of the blue light beam BLc1, wherein the diffusion elements 32 and the first wavelength conversion elements 28 are disposed side by side on the same circumference centering on the rotational axis Rx in the first surface 34a of the substrate 34, the second retardation element 24 is disposed between the first polarization split element 22 and the substrate 34, the second retardation element 24 is disposed between the second polarization split element 23 and the substrate 34, the first polarization split element 22 transmits the blue light beam BLp which enters the first polarization split element 22 along the +Z direction from the diffusion element 32 toward the +Z direction, and transmits the red light beam RL which enters the first polarization split element 22 along the +Z direction from the first wavelength conversion element 28 toward the +Z direction, and the second polarization split element 23 transmits the blue light beam BLp which enters the second polarization split element 23 along the +Z direction from the diffusion element 32 toward the +Z direction, and transmits the red light beam RL which enters the second polarization split element 23 along the +Z direction from the first wavelength conversion element 28 toward the +Z direction.

Further, the light source device 2 according to the present embodiment is further provided with the first optical element 35 which is disposed at the −Y direction side of the first polarization split element 22, and transmits the excitation light beam ELs entering the first optical element 35 along the +X direction from the light source section 21 toward the +X direction, the second optical element 36 which is disposed at the +X direction side of the first optical element 35, and reflects the excitation light beam ELs entering the second optical element 36 along the +X direction from the first optical element 35 toward the −Z direction, and the second wavelength conversion element 54 which is disposed at the −Z direction side of the second optical element 36, and performs the wavelength conversion on the excitation light beam ELs entering the second wavelength conversion element 54 from the second optical element 36 to emit the green light beam GL having the green wavelength band toward the +Z direction, wherein the green light beam GL enters the second optical element 36 along the +Z direction from the second wavelength conversion element 54, and the second optical element 36 transmits the green light beam GLp as the P-polarized light toward the +Z direction, and reflects the green light beam GLs as the S-polarized light toward the −X direction, and the green light beam GLs as the S-polarized light which enters the first optical element 35 along the −X direction from the second optical element 36 is reflected by the first optical element 35 toward the +Z direction.

In the present embodiment, the four colored light beams, namely the blue light beam BLp, the red light beam RL, the green light beam GLp, and the green light beam GLp, enter the light modulation device 6. According to this configuration, it is possible to realize the light source device 2 capable of emitting the plurality of colored light beams spatially separated from each other without using the polarization conversion element narrow in pitch described above. Thus, it becomes possible to reduce the light source device 2 in size, and by extension, it is possible to achieve reduction in size of the projector 1.

Further, in general, in the single-panel type projector, the energy density of light with which each of pixels of the liquid crystal panel is irradiated becomes higher compared to a projector provided with three liquid crystal panels for respectively modulating the red light, the green light, and the blue light. In particular, the blue light exerts serious damage caused by the irradiation with the light to the sub-pixels irradiated with the blue light compared to the red light and the green light. Therefore, there is a possibility that the sub-pixels of the liquid crystal panel are damaged, and thus, the reliability of the liquid crystal panel is deteriorated.

To cope with this problem, the projector 1 according to the present embodiment has the configuration in which the blue light beam BLp and the red light beam RL enter the first sub-pixel SX1 and the second sub-pixel SX2 out of the four sub-pixels SX constituting the pixel P of the light modulation device 6 while being temporally alternately interchanged, and therefore, there is no chance for the blue light to continuously enter one of the sub-pixels SX. Thus, the damage of the liquid crystal panel 61 caused by continuously irradiating a specific sub-pixel SX with the blue light is suppressed, and thus, it is possible to enhance the reliability of the liquid crystal panel 61.

Further, in the light source device 2 according to the present embodiment, the diffusion elements 32 and the first wavelength conversion elements 28 are disposed side by side on the same circumference centering on the rotational axis Rx in the first surface 34a of the substrate 34. Therefore, it is possible to temporally alternately emit the blue light beam BLp and the red light beam RL with no waste. Thus, it is possible to increase the use efficiency of the colored light beams.

When considering the light source device capable of emitting the four colored light beams at respective positions spatially separated from each other in the X-Y plane, it is conceivable to adopt a configuration in which, for example, two polarization split elements consisting of the first polarization split element and the second polarization split element are arranged in sequence in the +X direction, the diffusion element is disposed at the −Z direction side of the first polarization split element, the wavelength conversion element is disposed at the −Z direction side of the second polarization split element, and the four colored light beams obtained from the diffusion element and the wavelength conversion element are emitted toward the +Z direction on the condition that substantially the same light source section as in the present embodiment is used. This light source device will hereinafter be referred to as a light source device according to a comparative example.

In the light source device according to the comparative example, it is necessary to make the blue light beam as the S-polarized light reflected toward the −Z direction by the first polarization split element enter the diffusion element, and to make the second polarization split element reflect the blue light beam as the P-polarized light transmitted toward the +X direction through the first polarization split element toward the −Z direction to enter the wavelength conversion element. In other words, it is necessary to transmit the blue light beam as the P-polarized light in the first polarization split element on the one hand, but it is necessary to reflect the blue light beam in the second polarization split element.

However, it is common for the polarization split film used in the polarization split element to have a characteristic of reflecting the S-polarized light and transmitting the P-polarized light. Therefore, when realizing the light source device according to the comparative example, it is difficult to manufacture the second polarization split element for reflecting the blue light as the P-polarized light. Specifically, in order to realize the characteristic described above, it is necessary to make the number of layers in the dielectric multilayer film which forms the polarization split film of the second polarization split element extremely large, and it is difficult to form the dielectric multilayer film. Further, since the dielectric multilayer film extremely large in the number of layers is high in absorption of light, there is a problem that a loss of light occurs.

To cope with this problem, the light source device 2 according to the present embodiment is provided with the first retardation element 37 formed of a ½ wave plate with respect to the blue wavelength band disposed between the first polarization split element 22 and the second polarization split element 23. Therefore, the blue light beam BLp as the P-polarized light emitted from the first polarization split element 22 is converted by the first retardation element 37 into the blue light beam BLs as the S-polarized light, and is then reflected by the second polarization split element 23 to enter the light conversion device 31.

As described above, in the light source device 2 according to the present embodiment, since a special characteristic such as a characteristic of reflecting the P-polarized light or transmitting the S-polarized light is not required for the dielectric multilayer film which forms the first polarization split element 22 and the second polarization split element 23, it is easy to form the dielectric multilayer film. Specifically, since it is possible to reduce the number of layers of the dielectric multilayer film, it is possible to achieve reduction of the manufacturing cost and an improvement of the yield ratio. Further, it is possible to manufacture the first polarization split element 22 and the second polarization split element 23 excellent in light separation characteristic. As described above, according to the light source device 2 related to the present embodiment, it is possible to solve the problem described above which the light source device according to the comparative example has.

Further, the light source device 2 according to the present embodiment is further provided with the second retardation element 24 which is disposed between the first polarization split element 22 and the diffusion plate 31, and is disposed between the second polarization split element 23 and the substrate 34 of the light conversion device 31, and which the blue light beam BLs as the S-polarized light enters along the −Z direction.

According to this configuration, it is possible to convert the blue light beam BLs as the S-polarized light emitted from the first polarization split element 22 and the second polarization split element 23 into the blue light beam BLc1 as the circularly polarized light with the second retardation element 24, and then convert the blue light beam BLc2 as the circularly polarized light emitted from the diffusion element 32 into the blue light beam BLp as the P-polarized light with the second retardation element 24, and make the first polarization split element 22 and the second polarization split element 23 transmit the blue light beam BLp. Thus, it is possible to increase the use efficiency of the blue light beam BLc2 emitted from the diffusion element 32.

Further, in the light source device 2 according to the present embodiment, the light source section 21 has the first light emitting elements 211 for emitting the blue light beams BLs having the blue wavelength band, and the second light emitting elements 214 for emitting the excitation light beams ELs having the excitation wavelength band.

According to this configuration, a part of the blue light beam BLs emitted from the first light emitting element 211 makes a contribution as one of the colored light beams constituting the light L emitted from the light source device 2, and another part of the blue light beam BLs makes a contribution as the excitation light for exciting the first wavelength conversion element 28. Further, the excitation light beam ELs emitted from the second light emitting element 214 makes a contribution as the excitation light for exciting the second wavelength conversion element 54. Therefore, by disposing the first light emitting elements 211 for emitting the excitation light for the first wavelength conversion element and the second light emitting elements 214 for emitting the excitation light for the second wavelength conversion element separately from each other as in the present embodiment, it is possible to arbitrarily select the light emitting element having an optimum wavelength band for exciting the phosphors of the respective wavelength conversion layers.

It should be noted that when the blue wavelength band of the blue light beam BLs and the excitation wavelength band of the excitation light ELs are the same wavelength band, it is possible to use semiconductor lasers the same in specification as the first light emitting element 211 and the second light emitting element 214. Thus, it is possible to simplify the configuration of the light source device 2.

Further, in the light source device 2 according to the present embodiment, the light source section 21 has the first light emitting elements 211 for emitting the blue light beams BLs having the blue wavelength band, and the third retardation element 2131 which the blue light beams BLs emitted from the first light emitting elements 211 enter, and which emits the blue light beam including the blue light beam BLs as the S-polarized light and the blue light beam BLp as the P-polarized light.

According to this configuration, it is possible to surely make the blue light beam BLp as the P-polarized light and the blue light beam BLs as the S-polarized light enter the first polarization split element 22. Further, according to this configuration, since the polarization directions of the light beams emitted from the plurality of first light emitting elements 211 are allowed to be the same, it is sufficient to dispose the same solid-state light sources in the same orientation, and thus, it is possible to simplify the configuration of the light source section 21.

Further, in the light source device 2 according to the present embodiment, there is adopted the configuration in which the third retardation element 2131 can rotate around the rotational axis extending along the proceeding direction of the blue light beam BLs entering the third retardation element 2131.

According to this configuration, by adjusting the rotational angle of the third retardation element 2131, it is possible to adjust the ratio between the light intensity of the blue light beam BLs which enters the first polarization split element 22 and the light intensity of the blue light beam BLp which enters the first polarization split element 22.

The projector 1 according to the present embodiment is provided with the light source device 2 according to the present embodiment, the light modulation device 6 for modulating the light emitted from the light source device 2 in accordance with the image information, and the projection optical device 7 for projecting the light modulated by the light modulation device 6.

According to this configuration, it is possible to realize the projector 1 of a single plate type small in size and excellent in light use efficiency.

Further, the projector 1 according to the present embodiment is provided with the homogenization device 4 located between the light source device 2 and the light modulation device 6.

According to this configuration, it is possible to substantially uniformly illuminate the light modulation device 6 with the blue light beam BLp, the red light beam RL, the green light beam GLp, and the green light beam GLp emitted from the light source device 2. Thus, it is possible to suppress the color unevenness and the luminance unevenness in the projection image.

Further, in the projector 1 according to the present embodiment, the light modulation device 6 is provided with the microlens array 62 having the plurality of microlenses 621 corresponding to the plurality of pixels PX.

According to this configuration, it is possible to make the four colored light beams entering the light modulation device 6 enter the corresponding four sub-pixels SX in the liquid crystal panel 61 with the microlens 621. Thus, it is possible to make the colored light beams emitted from the light source device 2 efficiently enter the respective sub-pixels SX, and thus, it is possible to increase the use efficiency of the colored light beams.

The projector 1 according to the present embodiment is provided with the light source device 2, and the light modulation device 6 for modulating the light from the light source device 2 in accordance with the image information, wherein the light modulation device 6 has the liquid crystal panel 61 having the plurality of pixels PX, each of the pixels PX has at least the first sub-pixel SX1 and the second sub-pixel SX2, and the light source device 2 has the light conversion device 31 which emits the blue light beam BLp having the blue wavelength band, emits the red light beam RL having the red wavelength band, and temporally switches the first period in which the blue light beam BLp enters the first sub-pixel SX1 and the red light beam RL enters the second sub-pixel SX2, and the second period in which the blue light beam BLp enters the second sub-pixel SX2 and the red light beam RLp enters the first sub-pixel SX1.

It should be noted that the projector according to the present embodiment corresponds to a display device in the appended claims. The light conversion device 31 in the present embodiment corresponds to a switching section in the appended claims.

According to this configuration, since there is no chance for the blue light to continuously enter one of the sub-pixels SX, the damage of the liquid crystal panel 61 caused by continuously irradiating a specific sub-pixel SX with the blue light is suppressed, and thus, it is possible to enhance the reliability of the liquid crystal panel 61.

Modified Examples

It is also possible for the light source device 2 according to the present embodiment to have the following configuration.

Figure 9:
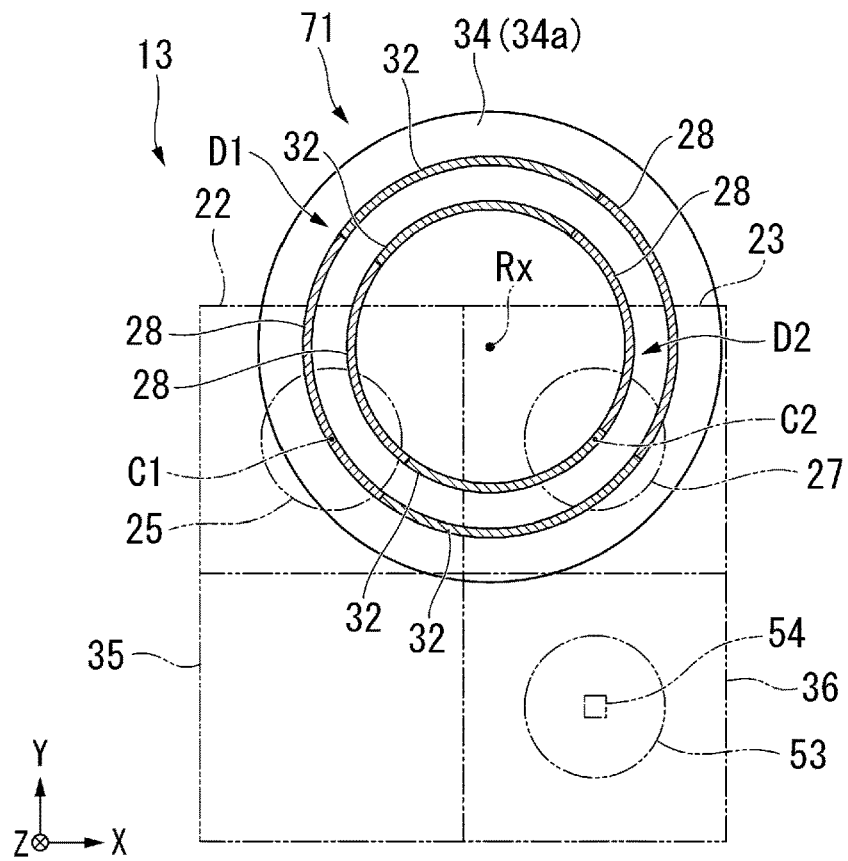
FIG. 9 is a front view of a light conversion device viewed from a +Z direction in a light source device according to a modified example.

FIG. 9 is a front view of a light conversion device 71 viewed from the +Z direction in a light source device 13 according to a modified example. It should be noted that in FIG. 9, constituents common to those shown in FIG. 6 used in the embodiment described above are denoted by the same symbols. Further, in FIG. 9, the diffusion elements 32 and the first wavelength conversion elements 28 are actually hidden behind the substrate 34 when viewing the light conversion device 71 from the −Z direction, but are drawn with the solid lines in order to make the drawing eye-friendly.

As shown in FIG. 6, in the embodiment described above, the rotational axis Rx of the substrate 34 is disposed on the straight line connecting the optical axis C1 of the first light collection element 25 and the optical axis C2 of the second light collection element 27. In contrast, in the light source device 13 according to the present modified example, as shown in FIG. 9, the rotational axis Rx of the substrate 34 is disposed at a position shifted toward the +Y direction from the straight line connecting the optical axis C1 of the first light collection element 25 and the optical axis C2 of the second light collection element 27. Further, positions of the boundaries between the diffusion elements 32 and the first wavelength conversion elements 28 in the first annular area D1 and positions of the boundaries between the diffusion elements 32 and the first wavelength conversion elements 28 in the second annular area D2 are shifted from each other in the circumferential direction centering on the rotational axis Rx.

Also in the light source device 13 according to the modified example, it is possible to emit the blue light beam BLp and the red light beam RL while being temporally alternately interchanged.

Second Embodiment

A second embodiment of the present disclosure will hereinafter be described using FIG. 10.

A light source device and a projector according to the second embodiment are substantially the same in basic configurations as those according to the first embodiment, and are different in configuration of the wavelength conversion element from that in the first embodiment. Therefore, in the present embodiment, the overall description of the light source device and the projector will be omitted.

Figure 10:
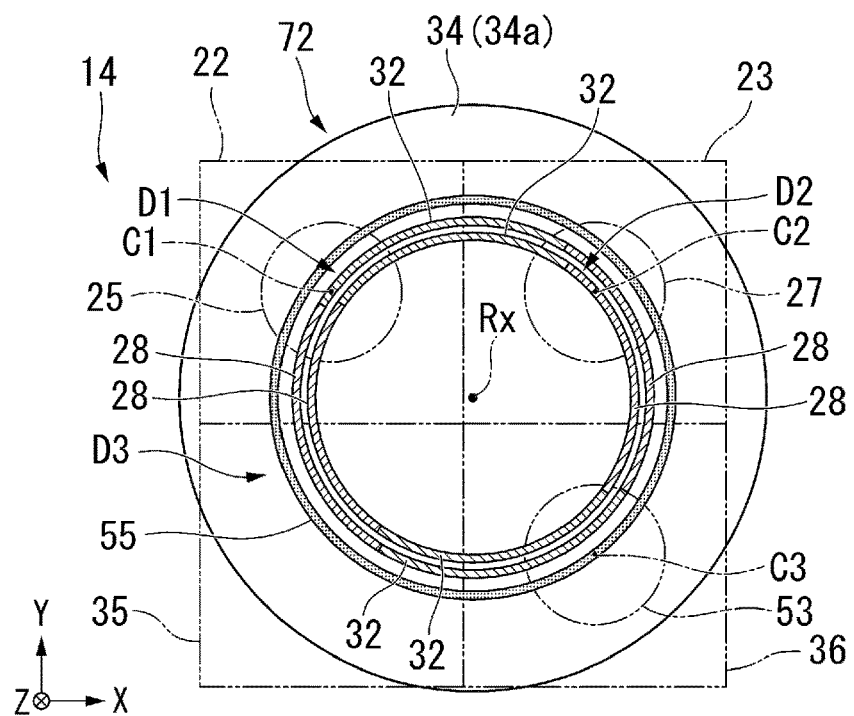
FIG. 10 is a front view of a light conversion device viewed from the +Z direction in a light source device according to a second embodiment.

FIG. 10 is a front view of a light conversion device 72 viewed from the +Z direction in the light source device 14 according to the second embodiment.

In FIG. 10, the constituents common to the drawing used in the first embodiment are denoted by the same reference symbols, and the description thereof will be omitted. Further, in FIG. 10, the diffusion elements 32, the first wavelength conversion elements 28, and the second wavelength conversion elements 55 are actually hidden behind the substrate 34 when viewing a light conversion device 72 from the −Z direction, but are drawn with the solid lines in order to make the drawing eye-friendly.

In the first embodiment, the diffusion elements 32 and the first wavelength conversion elements 28 are disposed on the substrate 34, and the second wavelength conversion element 54 is disposed separately from the substrate 34. In contrast, in the present embodiment, the second wavelength conversion element 55 is disposed on the substrate 34 together with the diffusion elements 32 and the first wavelength conversion elements 28.

As shown in FIG. 10, in the light conversion device 72 in the present embodiment, in the first surface 34a of the substrate 34, an area shaped like a ring at a predetermined distance from the rotational axis Rx in a radial direction centering on the rotational axis Rx is defined as the first annular area D1, an area shaped like a ring located inward in the radial direction from the first annular area D1 is defined as the second annular area D2, and an area shaped like a ring located outward in the radial direction from the first annular area D1 is defined as a third annular area D3. In other words, the first annular area D1, the second annular area D2, and the third annular area D3 are concentric circles centering on the rotational axis Rx. Further, in the radial direction centering on the rotational axis Rx, the distance of the first annular area D1 from the rotational axis Rx is longer than the distance of the second annular area D2 from the rotational axis Rx. Further, the distance of the third annular area D3 from the rotational axis Rx is longer than the distance of the first annular area D1 from the rotational axis Rx. In other words, in a plan view viewed from the −Z direction, the second annular area D2 is disposed at the inner side of the first annular area D1 throughout the entire circumference centering on the rotational axis Rx. The first annular area D1 is disposed at the inner side of the third annular area D3 throughout the entire circumference centering on the rotational axis Rx.

The first annular area D1 is a ring-like area which passes through the optical axis C1 of the first light collection element 25, and is irradiated with the blue light beam BLc1 emitted from the first polarization split element 22 and entering the substrate 34 via the second retardation element 24 and the first light collection element 25 when the substrate 34 rotates. Further, the second annular area D2 is a ring-like area which passes through the optical axis C2 of the second light collection element 27, and is irradiated with the blue light beam BLc1 emitted from the second polarization split element 23 and entering the substrate 34 via the second retardation element 24 and the second light collection element 27 when the substrate 34 rotates. Further, the third annular area D3 is a ring-like area which passes through an optical axis C3 of the third light collection element 53, and is irradiated with the excitation light beam ELs emitted from the second optical element 36 and entering the substrate 34 via the third light collection element 53 when the substrate 34 rotates.

The configuration of the first annular area D1 and the second annular area D2 is substantially the same as in the first embodiment. Specifically, in the first annular area D1, the diffusion elements 32 and the first wavelength conversion elements 28 are alternately disposed along the circumferential direction centering on the rotational axis Rx. In the second annular area D2, the diffusion elements 32 and the first wavelength conversion elements 28 are alternately disposed along the circumferential direction centering on the rotational axis Rx. Further, in the third annular area D3, there is disposed the second wavelength conversion element 55 throughout the entire circumference centering on the rotational axis Rx. The second wavelength conversion element 55 includes the green phosphor which performs the wavelength conversion on the excitation light beam ELs to emit the green light beam GL similarly to the second wavelength conversion element 54 in the first embodiment. In other words, in the radial direction centering on the rotational axis Rx, the distance of the second wavelength conversion element 55 from the rotational axis Rx is longer than the distances of the diffusion elements 32 and the first wavelength conversion elements 28 from the rotational axis Rx.

The rest of the configuration of the light source device 14 is substantially the same as the configuration of the light source device 2 according to the first embodiment.

Due to the configuration described above, the blue light beam BLc1 emitted from the first polarization split element 22 temporally alternately enters the diffusion element 32 and the first wavelength conversion element 28 in the first annular area D1. The blue light beam BLc1 emitted from the second polarization split element 23 temporally alternately enters the first wavelength conversion element 28 and the diffusion element 32 in the second annular area D2. The excitation light beam ELs emitted from the second optical element 36 always enters the second wavelength conversion element 55 in the third annular area D3.

Advantages of Second Embodiment

Also in the present embodiment, it is possible to obtain substantially the same advantages as in the first embodiment such as the advantage that it is possible to realize the light source device 14 capable of emitting the plurality of colored light beams made uniform in polarization direction without using the polarization conversion element narrow in pitch, the advantage that it is possible to achieve the reduction in size of the light source device 14 and the projector 1, and the advantage that it is possible to enhance the reliability of the liquid crystal panel 61 forming the light modulation device 6.

Further, in the light source device 14 according to the present embodiment, the second wavelength conversion element 55 is disposed on the first surface 34a of the substrate 34, and the distance of the second wavelength conversion element 55 from the rotational axis Rx is longer than the distances of the diffusion elements 32 and the first wavelength conversion elements 28 from the rotational axis Rx in the radial direction entering on the rotational axis Rx.

According to this configuration, since there is no need to dispose the second wavelength conversion element as a separate body from the light conversion device 72, it is possible to simplify the configuration of the light source device 14. Further, since the second wavelength conversion element 55 is formed on the substrate 34 so as to form the ring-like shape, and the irradiation position with the excitation light beam ELs moves on the second wavelength conversion element 55, the rise in temperature of the second wavelength conversion element 55 is suppressed, and thus, it is possible to increase the wavelength conversion efficiency and the reliability of the second wavelength conversion element 55.

Third Embodiment

A third embodiment of the present disclosure will hereinafter be described using FIG. 11 through FIG. 16.

A projector according to the third embodiment is substantially the same in basic configuration as that of the first embodiment, but is different in the configuration of the light source device from that of the first embodiment. Therefore, in the present embodiment, the overall description of the projector will be omitted.

Figure 11:
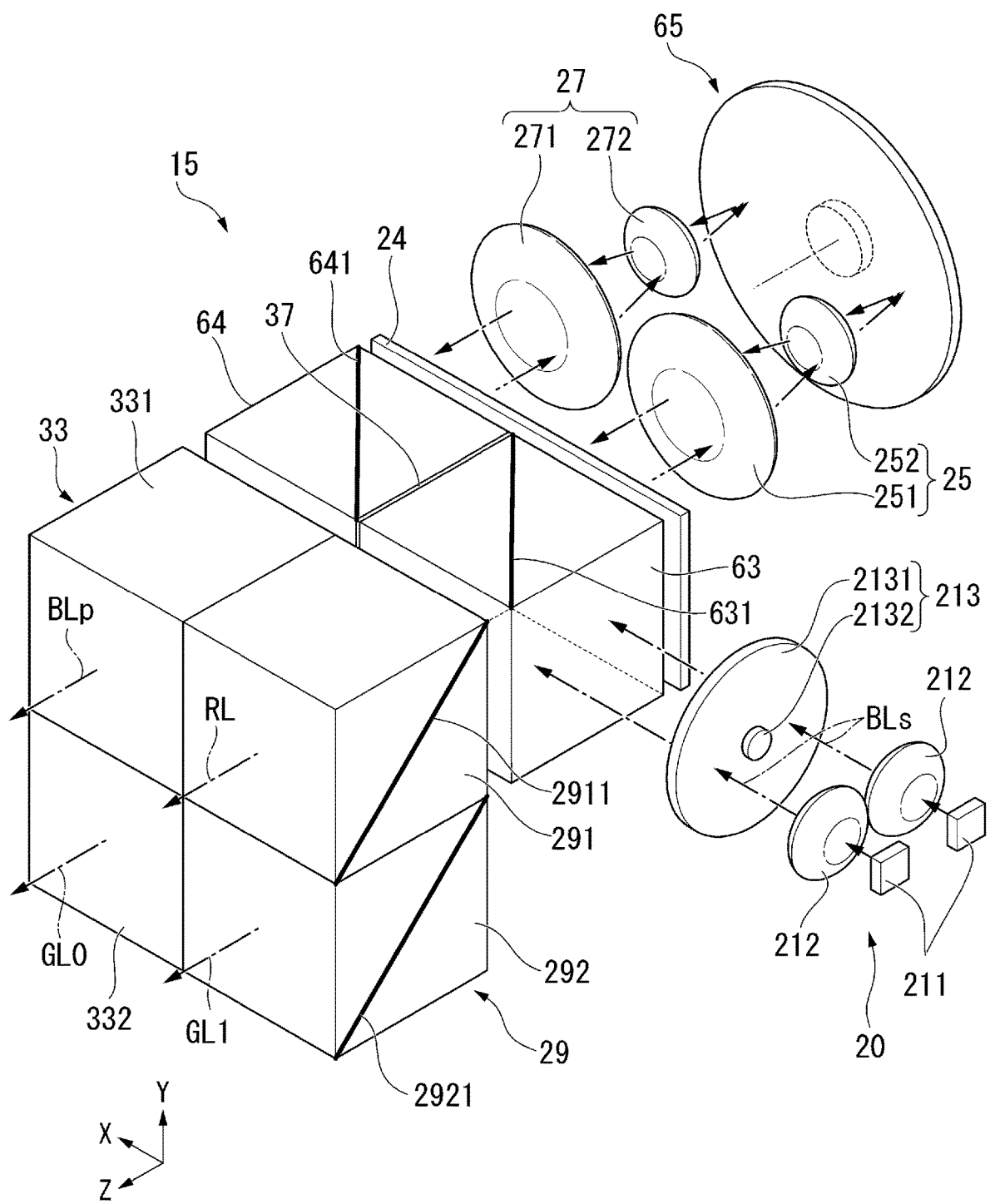
FIG. 11 is a perspective view of a light source device according to a third embodiment.
Figure 12:
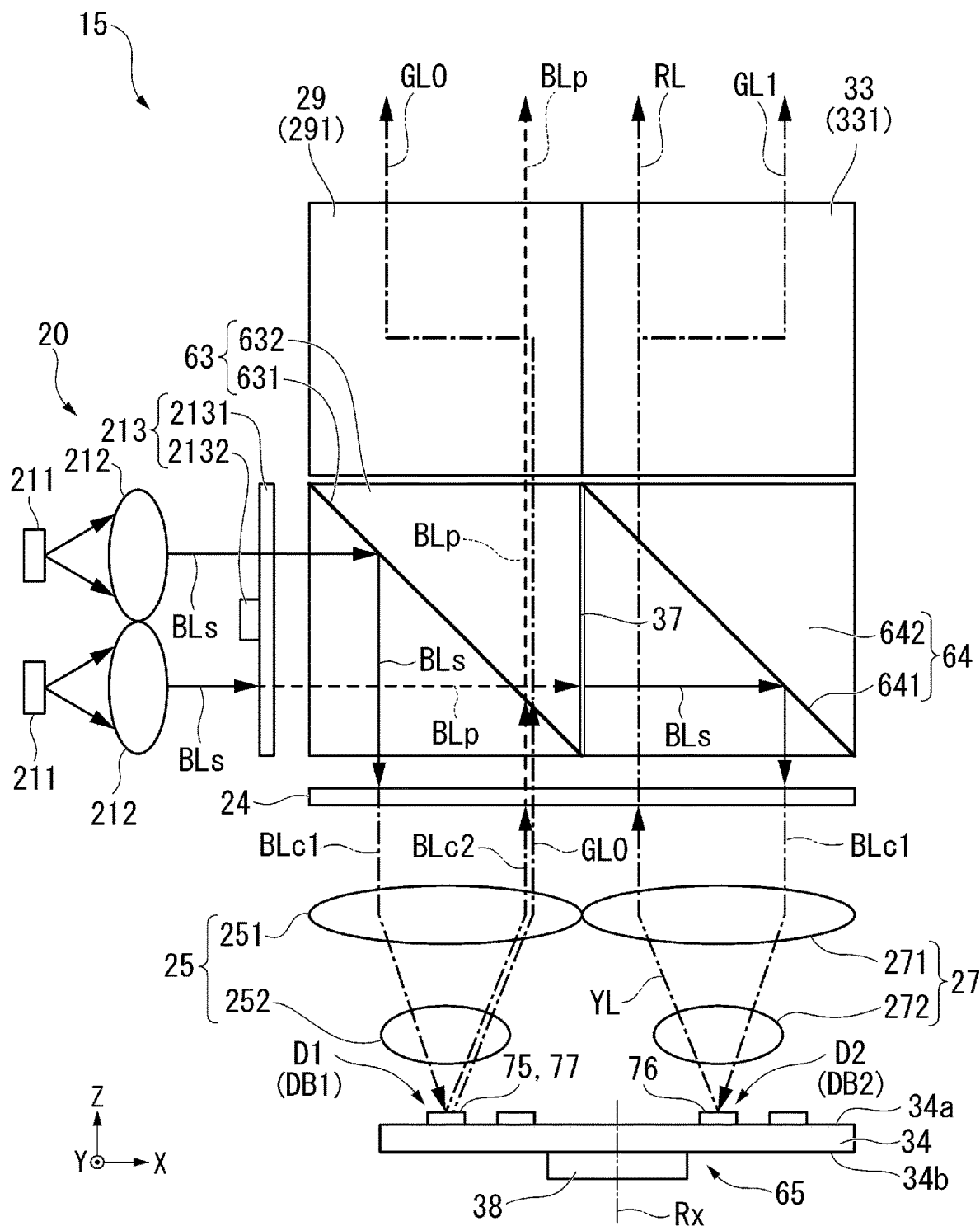
FIG. 12 is a plan view of the light source device viewed from the +Y direction, and shows a behavior of light in the first period.
Figure 13:
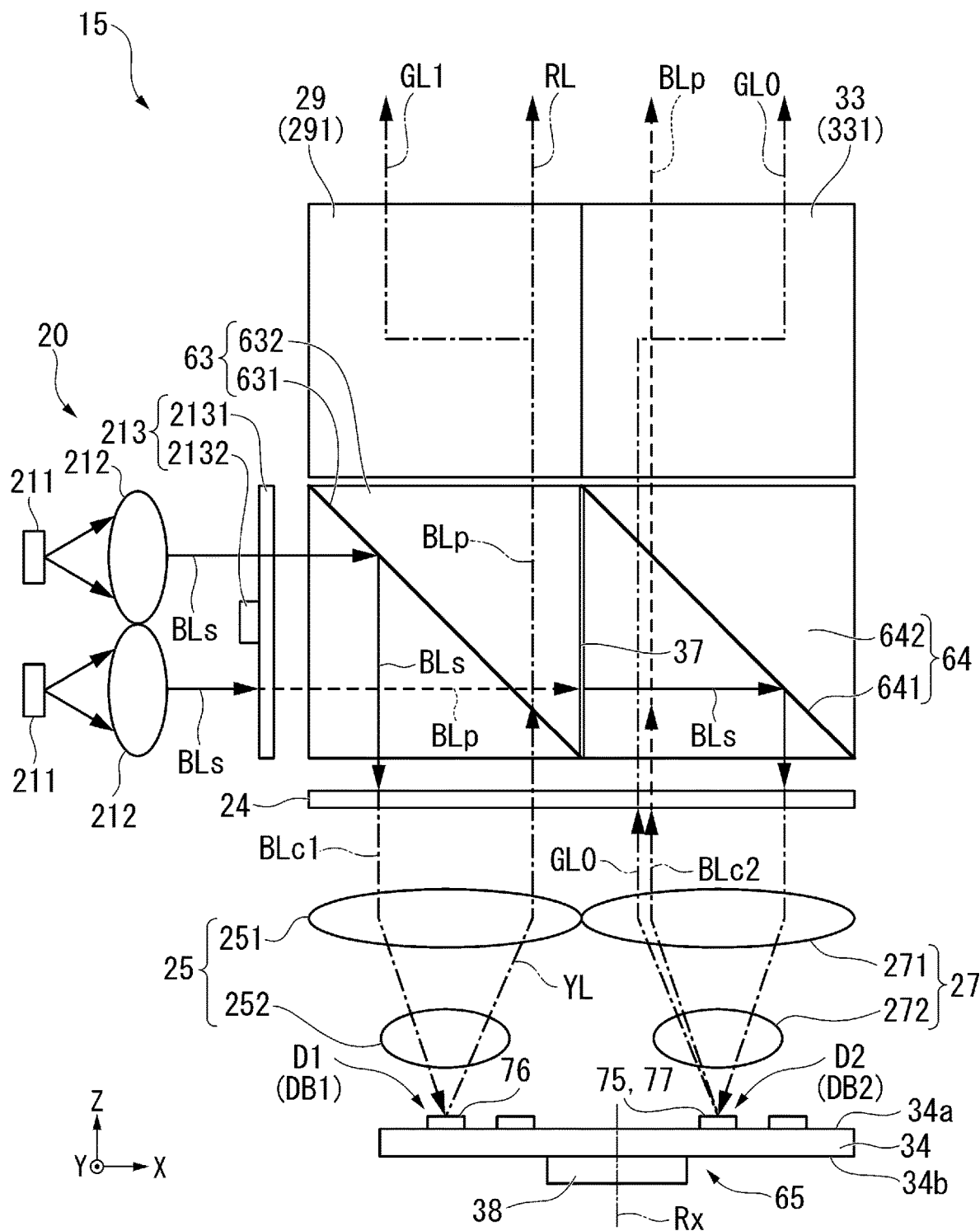
FIG. 13 is a plan view of the light source device viewed from the +Y direction, and shows the behavior of the light in the second period.
Figure 14:
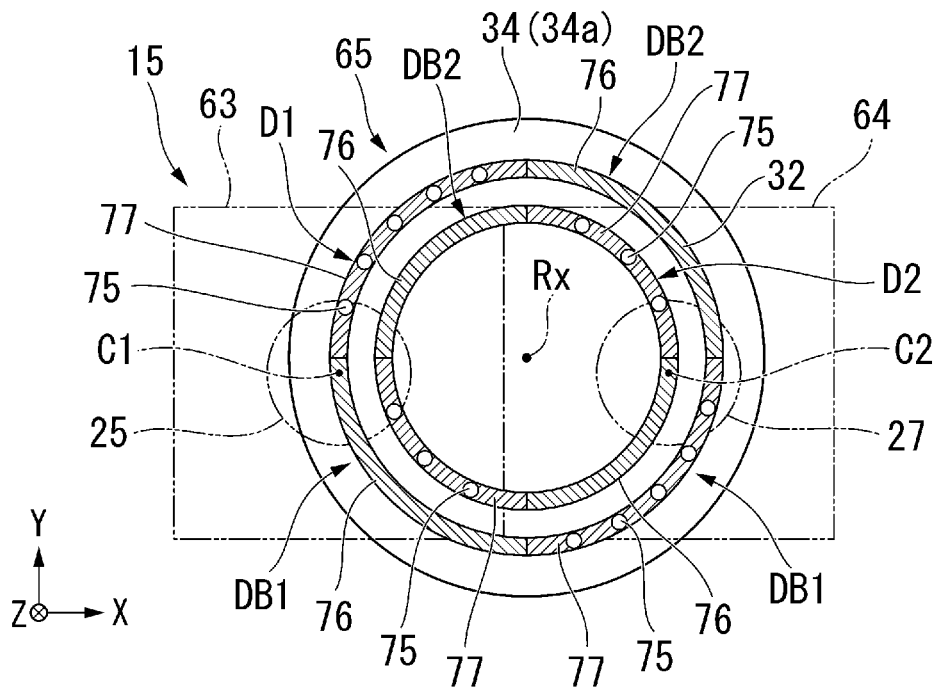
FIG. 14 is a front view of a light conversion device viewed from a −Z direction.
Figure 15:
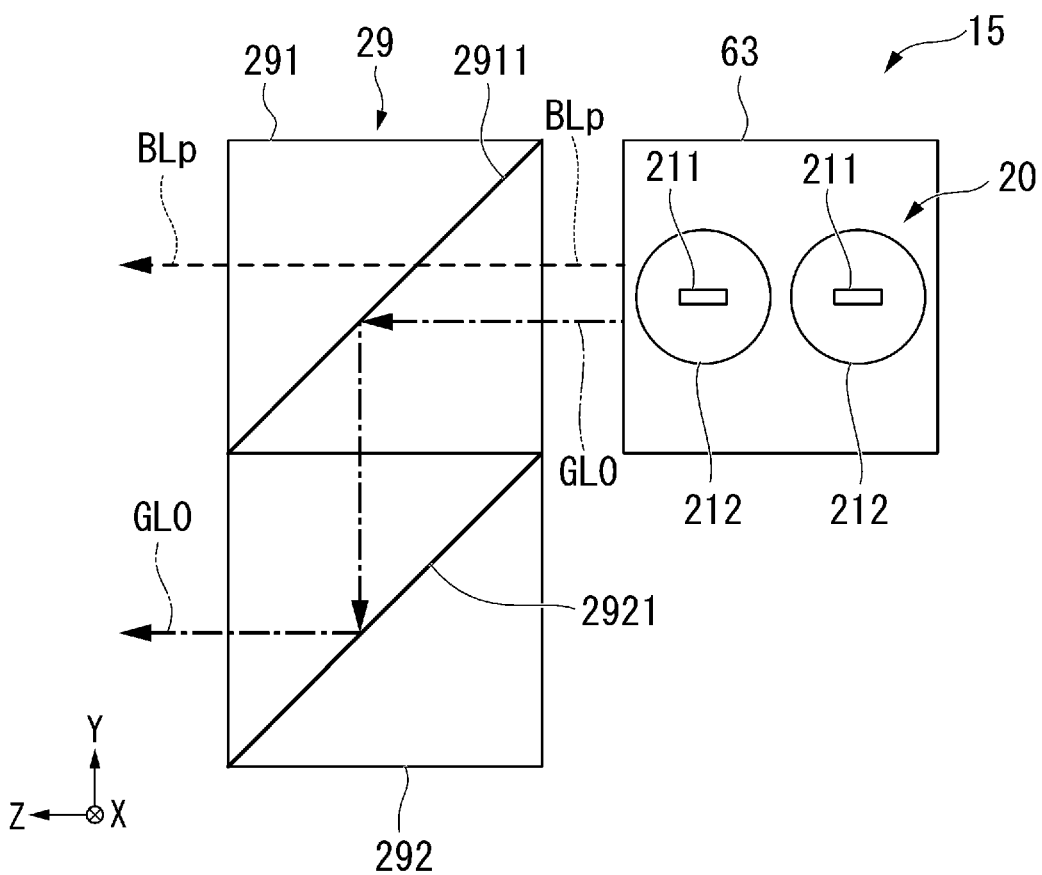
FIG. 15 is a side view of the light source device viewed from a −X direction, and shows a behavior of light in the first period.
Figure 16:
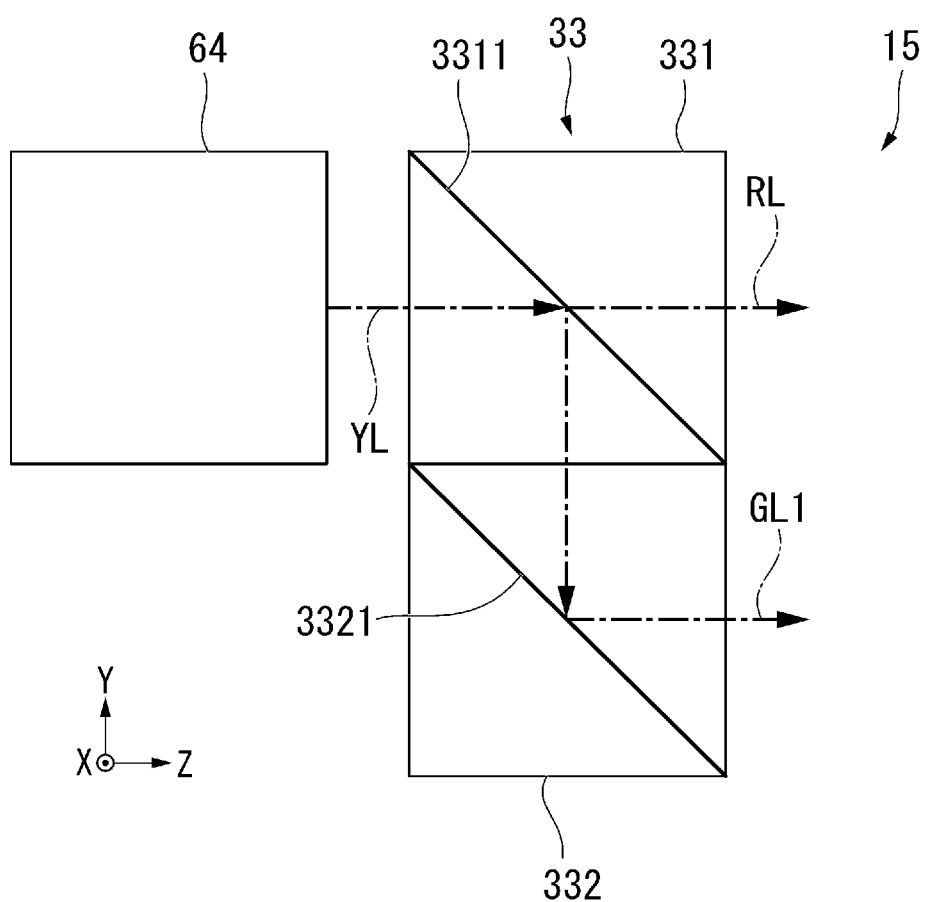
FIG. 16 is a side view of the light source device viewed from a +X direction, and shows the behavior of the light in the first period.

FIG. 11 is a perspective view of the light source device 15 according to the present embodiment. FIG. 12 is a plan view of the light source device 15 viewed from the +Y direction, and shows a behavior of light in the first period. FIG. 13 is a plan view of the light source device 15 viewed from the +Y direction, and shows a behavior of light in the second period. FIG. 14 is a front view of the light conversion device 65 viewed from the −Z direction. FIG. 15 is a side view of the light source device 15 viewed from the −X direction, and shows a behavior of light in the first period. FIG. 16 is a side view of the light source device 15 viewed from the +X direction, and shows a behavior of light in the first period.

In FIG. 11 through FIG. 16, the constituents common to the drawings used in the first embodiment are denoted by the same reference symbols, and the description thereof will be omitted. It should be noted that in FIG. 14, diffusion elements 75, first wavelength conversion elements 76, and second wavelength conversion elements 77 are actually hidden behind the substrate 34 when viewing a light conversion device 65 from the −Z direction, but are drawn with the solid lines in order to make the drawing eye-friendly.

As shown in FIG. 11, the light source device 15 according to the present embodiment emits the light L consisting of four light beams, namely the red light beam RL, the blue light beam BLp, a green light beam GL1, and a green light beam GL0, emitted from respective positions spatially different from each other.

As shown in FIG. 11 through FIG. 16, the light source device 15 is provided with a light source section 20, a first polarization split element 63, the first retardation element 37, a second polarization split element 64, the second retardation element 24, the first light collection element 25, the second light collection element 27, a light conversion device 65, the first color separation element 29, and the second color separation element 33.

P-polarized light in the present embodiment corresponds to light polarized in the first polarization direction in the appended claims. S-polarized light in the present embodiment corresponds to light polarized in the second polarization direction in the appended claims. Further, as described later, the orientation of a film for separating the polarization or the colored light beams is different between a group consisting of the first polarization split element 63 and the second polarization split element 64, and a group consisting of the first color separation element 29 and the second color separation element 33. Therefore, the descriptions of P-polarized light and S-polarized light represent the polarization direction with respect to the first polarization split element 63 and the second polarization split element 64, and are reversed in the polarization direction with respect to the first color separation element 29 and the second color separation element 33.

Specifically, the P-polarized light with respect to the first polarization split element 63 and the second polarization split element 64 corresponds to the S-polarized light with respect to the first color separation element 29 and the second color separation element 33. The S-polarized light with respect to the first polarization split element 63 and the second polarization split element 64 corresponds to the P-polarized light with respect to the first color separation element 29 and the second color separation element 33. It should be noted that since there is a possibility that the description gets confusing when changing the name of one type of light in accordance with the element which the polarized light enters, the P-polarized light and the S-polarized light are hereinafter described as the polarization direction with respect to the first polarization split element 63 and the second polarization split element 64 without changing the name of the polarized light in accordance with the element which these types of polarized light enter.

Further, in each of the drawings, the P-polarized light is represented by a dotted-line arrow, the S-polarized light is represented by a solid arrow, and light in other polarization states than the P-polarized light and the S-polarized light is represented by a dashed-dotted-line arrow.

Configuration of Light Source Section

The blue light beams BLs, BLs which enter the first polarization split element 63 are emitted by the light source section 20 along the +X direction. The light source section 20 has the plurality of first light emitting elements 211, the plurality of first collimator lenses 212, and the rotary retardation device 213. In other words, the light source section 20 in the present embodiment does not have the second light emitting elements 214 for emitting the excitation light which excites the second wavelength conversion element 54.

The configuration of the first light emitting elements 211, the first collimator lenses 212, and the rotary retardation device 213 is substantially the same as in the first embodiment. It should be noted that in the present embodiment, as described later, the phosphor included in the first wavelength conversion element 76 is different from the phosphor of the first wavelength conversion element 28 in the first embodiment. Therefore, it is possible to make the wavelength band of the light emitted from the first light emitting element 211 different from the wavelength band of the light emitted from the first light emitting element 211 in the first embodiment in accordance with the phosphor used in the present embodiment.

Configuration of First Polarization Split Element

The first polarization split element 63 is disposed at the +X direction side of the first light emitting element 211 of the light source section 20. The blue light beam including the blue light beam BLs as the S-polarized light and the blue light beam BLp as the P-polarized light emitted from the light source section 20 enters the first polarization split element 63 along the +X direction. Further, the blue light beam BLp emitted from the diffusion element 75 of the light conversion device 65, the green light beam GL0 emitted from the second wavelength conversion element 77, and a yellow light beam YL emitted from the first wavelength conversion element 76 enter the first polarization split element 63 along the +Z direction.

The basic configuration of the first polarization split element 63 is substantially the same as the basic configuration of the first polarization split element 22 in the first embodiment. The first polarization split element 63 has a first polarization split layer 631 and a first base member 632. It should be noted that due to the difference in wavelength band of the light entering the first polarization split element 63, the characteristic of the first polarization split layer 631 is different from the characteristic of the first polarization split layer 221 in the first embodiment. Specifically, the first polarization split layer 631 has a polarization split characteristic of transmitting the P-polarized light and reflecting the S-polarized light with respect to the light in the blue wavelength band, and a characteristic of transmitting the light in the wavelength band including the green wavelength band and the red wavelength band irrespective of the polarization direction.

Therefore, the first polarization split element 63 transmits the blue light beam BLp as the P-polarized light which enters the first polarization split element 22 along the +X direction from the light source section 20 toward the +X direction, and reflects the blue light beam BLs as the S-polarized light which enters the first polarization split element 22 along the +X direction from the light source section 20 toward the −Z direction crossing the +X direction. Further, the first polarization split element 63 transmits the blue light beam BLp which enters the first polarization split element 63 along the +Z direction from the diffusion element 75 of the light conversion device 65 toward the +Z direction, transmits the green light beam GL which enters the first polarization split element 63 along the +Z direction from the second wavelength conversion element 77 toward the +Z direction, and transmits the yellow light beam YL which enters the first polarization split element 63 along the +Z direction from the first wavelength conversion element 76 toward the +Z direction.

It should be noted that the first polarization split element 63 can be constituted by a single base member, and an optical film disposed on one surface or two surfaces of the base member. In other words, the first polarization split element 63 can be formed of a plate type polarization split element.

Configuration of Second Polarization Split Element

The second polarization split element 64 is disposed at the +X direction side of the first retardation element 37. The blue light beams BLs as the S-polarized light emitted from the first retardation element 37 enter the second polarization split element 64 along the +X direction. Further, the blue light beam BLp emitted from the diffusion element 75 of the light conversion device 65, the green light beam GL0 emitted from the second wavelength conversion element 77, and the yellow light beam YL emitted from the first wavelength conversion element 76 enter the second polarization split element 64 along the +Z direction.

The basic configuration of the second polarization split element 64 is substantially the same as the basic configuration of the second polarization split element 23 in the first embodiment. The second polarization split element 64 has a second polarization split layer 641 and a second base member 642. It should be noted that similarly to the first polarization split element 63, due to the difference in wavelength band of the light entering the second polarization split element 64, the characteristic of the second polarization split layer 641 is different from the characteristic of the second polarization split layer 231 in the first embodiment. Specifically, the second polarization split layer 641 has a characteristic of transmitting the light in the wavelength band including the green wavelength band and the red wavelength band irrespective of the polarization state.

Therefore, the blue light beam BLs as the S-polarized light which enters the second polarization split element 64 along the +X direction from the first retardation element 37 is reflected by the second polarization split element 64 toward the −Z direction crossing the +X direction. Further, the second polarization split element 64 transmits the blue light beam BLp which enters the second polarization split element 64 along the +Z direction from the diffusion element 75 of the light conversion device 65 toward the +Z direction, transmits the green light beam GL which enters the second polarization split element 64 along the +Z direction from the second wavelength conversion element 77 toward the +Z direction, and transmits the yellow light beam YL which enters the second polarization split element 64 along the +Z direction from the first wavelength conversion element 76 toward the +Z direction.

It should be noted that the second polarization split element 64 can be constituted by a single base member, and an optical film disposed on one surface or two surfaces of the base member. In other words, the second polarization split element 64 can be formed of a plate type polarization split element.

Configuration of Light Conversion Device

As shown in FIG. 14, in the light conversion device 65 in the present embodiment, on the first surface 34a of the substrate 34, there are disposed the first annular area D1 and the second annular area D2 located at the inner side in the radial direction of the first annular area D1. The first annular area D1 is irradiated with the blue light beam BLc1 which is emitted from the first polarization split element 63, and enters the first annular area D1 via the second retardation element 24 and the first light collection element 25. Further, the second annular area D2 is irradiated with the blue light beam BLc1 which is emitted from the second polarization split element 64, and enters the second annular area D2 via the second retardation element 24 and the second light collection element 27.

In the case of the present embodiment, the first annular area D1 is divided into four divisional areas having predetermined central angles centering on the rotational axis Rx. When defining one of the two divisional areas adjacent to each other as a first divisional area DB1, and the other thereof as a second divisional area DB2, the diffusion elements 75 and the second wavelength conversion element 77 are disposed in the first divisional area DB1, and the first wavelength conversion element 76 is disposed in the second divisional area DB2. Specifically, the first wavelength conversion elements 76 and the second wavelength conversion elements 77 are disposed side by side on the same circumference centering on the rotational axis Rx on the substrate 34. Further, on the same circumference on the substrate 34 centering on the rotational axis Rx, the first divisional areas DB1 each provided with the diffusion elements 75 and the second wavelength conversion element 77, and the second divisional areas DB2 each provided with the first wavelength conversion element 76 are disposed side by side.

In the first divisional area DB1, the plurality of diffusion elements 75 is disposed in a dispersed manner, and the second wavelength conversion element 77 is disposed so as to surround the plurality of diffusion elements 75. In other words, the plurality of diffusion elements 75 is disposed inside the formation area of the second wavelength conversion element 77. The plurality of the diffusion elements 75 has substantially the same configuration as that of the diffusion element 32 in the first embodiment to diffuse the blue light beam BLc1 which enters the diffusion element 75. Further, the second wavelength conversion element 77 includes the green phosphor, and performs the wavelength conversion on the blue light beam BLc1 which enters the second wavelength conversion element 77 to emit the green light beam GL0.

Meanwhile, the first wavelength conversion element 76 disposed in the second divisional area DB2 includes the yellow phosphor, and performs the wavelength conversion on the blue light beam BLc1 which enters the first wavelength conversion element 76 to emit the yellow light beam YL. Specifically, the first wavelength conversion element 76 includes, for example, an yttrium aluminum garnet (YAG) type phosphor containing cerium (Ce) as an activator agent. The first wavelength conversion element 76 emits the fluorescence having a wavelength band including the green wavelength band and the red wavelength band longer than the blue wavelength band of the blue light beam BLc1 which enters the first wavelength conversion element 76, namely the yellow light beam YL. The yellow light beam YL has a wavelength band of, for example, 500 through 650 nm. The yellow light beam YL is light having a wavelength band including the green wavelength band and the red wavelength band.

The yellow light beam YL in the present embodiment corresponds to the second light beam having the second wavelength band in the appended claims.

The second annular area D2 is substantially the same in configuration as the first annular area D1. Specifically, in the second annular area D2, on the same circumference on the substrate 34 centering on the rotational axis Rx, the first divisional areas DB1 each provided with the diffusion elements 75 and the second wavelength conversion element 77, and the second divisional areas DB2 each provided with the first wavelength conversion element 76 are disposed side by side.

Further, in the radial direction centering on the rotational axis Rx, the second divisional area DB2 in the second annular area D2 is disposed at the inner side in the radial direction of the first divisional area DB1 in the first annular area D1, and the first divisional area DB1 in the second annular area D2 is disposed at the inner side in the radial direction of the second divisional area DB2 in the first annular area D1. In other words, in the first annular area D1 and the second annular area D2, the first divisional area DB1 and the second divisional area DB2 are arranged in a staggered manner. It should be noted that although each of the first annular area D1 and the second annular area D2 is divided into the four divisional areas in the present embodiment, the division number of each of the first annular area D1 and the second annular area D2 is not limited to four, and can arbitrarily be changed.

Due to this configuration, the blue light beam BLc1 emitted from the first polarization split element 63 temporally alternately enters the first divisional area DB1 and the second divisional area DB2 in the first annular area D1. The blue light beam BLc1 emitted from the second polarization split element 64 temporally alternately enters the second divisional area DB2 and the first divisional area DB1 in the second annular area D2. As shown in FIG. 12, in the first period in which the blue light beam BLc1 emitted from the first polarization split element 63 enters the first divisional area DB1 in the first annular area D1, the blue light beam BLc1 emitted from the second polarization split element 64 enters the second divisional area DB2 in the second annular area D2. As shown in FIG. 13, in the second period in which the blue light beam BLc1 emitted from the first polarization split element 63 enters the second divisional area DB2 in the first annular area D1, the blue light beam BLc1 emitted from the second polarization split element 64 enters the first divisional area DB1 in the second annular area D2.

Therefore, in the first period, the blue light beam BLc2 generated in the diffusion elements 75 and the green light beam GL0 generated in the second wavelength conversion element 77 are emitted from the first annular area D1 at the same time as shown in FIG. 12. The blue light beam BLc2 and the green light beam GL0 are collimated by passing through the first light collection element 25 in the +Z direction, and then enter the second retardation element 24. On this occasion, the blue light beam BLc2 which enters the second retardation element 24 from the first light collection element 25 is converted by the second retardation element 24 into the blue light beam BLp as the P-polarized light. The blue light beam BLp as the P-polarized light is transmitted through the first polarization split element 63 toward the +Z direction, and is then emitted from the first polarization split element 63. Further, the green light beam GL0 is unpolarized light, and therefore, does not change in the polarization state when entering the second retardation element 24, and is transmitted through the first polarization split element 63 toward the +Z direction, and is then emitted from the first polarization split element 63. In such a manner, the blue light beam BLp and the green light beam GL0 are emitted from the first polarization split element 63.

Meanwhile, in the first period, the yellow light beam YL generated in the first wavelength conversion element 76 is emitted from the second annular area D2. The yellow light beam YL is collimated by passing through the second light collection element 27 toward the +Z direction, and then enters the second retardation element 24. The yellow light beam YL is unpolarized light, and therefore, does not change in the polarization state when entering the second retardation element 24, and is transmitted through the second polarization split element 64 toward the +Z direction, and is then emitted from the second polarization split element 64.

Further, in the second period, as shown in FIG. 13, the light beam emitted from the first polarization split element 63 and the light beam emitted from the second polarization split element 64 are interchanged from the first period. In other words, the yellow light beam YL is emitted from the first polarization split element 63, and the light beam including the blue light beam BLp and the green light beam GL0 is emitted from the second polarization split element 64. In such a manner, the light beam including the blue light beam BLp and the green light beam GL0, and the red light beam RL are emitted from the first polarization split element 63 and the second polarization split element 64 while being temporally alternately replaced with each other.

Configuration of First Color Separation Element

FIG. 15 is a side view of the light source device 15 viewed from the −X direction. In other words, FIG. 15 shows the state of the first color separation element 29 viewed from the −X direction. FIG. 16 is a side view of the light source device 15 viewed from the +X direction. In other words, FIG. 16 shows the state of the second color separation element 33 viewed from the +X direction. In FIG. 15 and FIG. 16, in order to make the drawing eye-friendly, there is omitted the illustration of the rotary retardation device 213, the second retardation element 24, the first light collection element 25, the light conversion device 65, and so on out of the constituents shown in FIG. 11. In FIG. 15 and FIG. 16, there is shown the behavior of the light in the first period.

As shown in FIG. 15, the first color separation element 29 is disposed at the +Z direction side of the first polarization split element 63. Further, as shown in FIG. 16, the second color separation element 33 is disposed at the +Z direction side of the second polarization split element 64. Further, since the two light beams having respective wavelength band different from each other, namely the light beam including the blue light beam BLp and the blue light beam GL0, and the yellow light beam YL are temporally alternately emitted from the first polarization split element 63 and the second polarization split element 64, the first color separation element 29 and the second color separation element 33 have the same characteristic.

The first color separation element 29 has a dichroic prism 291 and the reflecting prism 292. The dichroic prism 291 and the reflecting prism 292 are arranged side by side along the Y axis. In the first period, the first color separation element 29 separates the light emitted toward the +Z direction from the first polarization split element 63 into the blue light beam BLp having the blue wavelength band and the green light beam GL0 having the green wavelength band. Further, in the second period, the first color separation element 29 separates the yellow light beam YL emitted toward the +Z direction from the first polarization split element 63 into the red light beam RL having the red wavelength band and the green light beam GL1 having the green wavelength band.

The blue light beam BLp having the blue wavelength band in the present embodiment corresponds to the third light beam having the first wavelength band in the appended claims. The green light beam GL0 having the green wavelength band in the present embodiment corresponds to a fourth light beam having the third wavelength band in the appended claims. The green light beam GL1 having the green wavelength band in the present embodiment corresponds to a fifth light beam having a fourth wavelength band in the appended claims. Further, the red light beam RL having the red wavelength band in the present embodiment corresponds to a sixth light beam having a fifth wavelength band in the appended claims.

The dichroic prism 291 is formed of a prism type color separation element formed by combining two base members each having a substantially isosceles right triangular prismatic shape with each other to form a substantially rectangular solid shape. On the interface between the two base members, there is disposed a color separation layer 2911. The color separation layer 2911 is tilted 45° with respect to the Y axis and the Z axis. In other words, the color separation layer 2911 is tilted 45° with respect to the X-Y plane and the X-Z plane. It should be noted that it is possible to adopt a dichroic mirror instead of the dichroic prism.

The color separation layer 2911 is formed of a dichroic film which reflects light having the green wavelength band out of the light entering the color separation layer 2911, and transmits colored light having a wavelength band other than the green wavelength band. Therefore, in the first period, when the light beam including the blue light beam BLp and the green light beam GL0 enters the dichroic prism 291 along the +Z direction, the green light beam GL0 is reflected toward the −Y direction, and the blue light beam BLp is transmitted toward the +Z direction. The blue light beam BLp is emitted outside the dichroic prism 291, and then enters the homogenization device 4 shown in FIG. 1. Further, in the second period, when the yellow light beam YL enters the dichroic prism 291 along the +Z direction, the green light beam GL1 is reflected toward the −Y direction, and the red light beam RL is transmitted toward the +Z direction. The red light beam RL is emitted outside the dichroic prism 291, and then enters the homogenization device 4 shown in FIG. 1.

The reflecting prism 292 is disposed at the −Y direction side of the dichroic prism 291. The reflecting prism 292 is a prism type reflecting element formed by combining two base members each having a substantially isosceles right triangular prismatic shape with each other to form a substantially rectangular solid shape. On the interface between the two base members, there is disposed a reflecting layer 2921.

The light beam which enters the reflecting layer 2921 along the −Y direction from the dichroic prism 291 is reflected toward the +Z direction by the reflecting layer 2921. The light beam reflected by the reflecting layer 2921 is emitted from the reflecting prism 292 toward the +Z direction. Therefore, in the first period, the green light beam GL0 which enters the reflecting prism 292 along the −Y direction is reflected by the reflecting prism 292 toward the +Z direction. Further, in the second period, the green light beam GL1 which enters the reflecting prism 292 along the −Y direction is reflected by the reflecting prism 292 toward the +Z direction. It should be noted that it is possible to adopt a reflecting mirror instead of the reflecting prism 292.

Configuration of Second Color Separation Element

As shown in FIG. 16, the second color separation element 33 has a dichroic prism 331 and a reflecting prism 332. The dichroic prism 331 and the reflecting prism 332 are arranged side by side along the Y axis. Further, in the first period, the second color separation element 33 separates the yellow light beam YL emitted toward the +Z direction from the second polarization split element 64 into the red light beam RL having the red wavelength band and the green light beam GL1 having the green wavelength band. Further, in the second period, the second color separation element 33 separates the light emitted toward the +Z direction from the second polarization split element 64 into the blue light beam BLp having the blue wavelength band and the green light beam GL0 having the green wavelength band.

The dichroic prism 331 is formed of a prism type color separation element formed by combining two base members each having a substantially isosceles right triangular prismatic shape with each other to form a substantially rectangular solid shape. On the interface between the two base members, there is disposed a color separation layer 3311. The color separation layer 3311 is formed of a dichroic film which reflects light having the green wavelength band out of the light entering the color separation layer 3311, and transmits colored light having a wavelength band other than the green wavelength band. Therefore, in the first period, when the yellow light beam YL enters the dichroic prism 331 along the +Z direction, the green light beam GL1 is reflected toward the −Y direction, and the red light beam RL is transmitted toward the +Z direction. The red light beam RL is emitted outside the dichroic prism 331, and then enters the homogenization device 4 shown in FIG. 1. Further, in the second period, when the light beam including the blue light beam BLp and the green light beam GL0 enters the dichroic prism 331 along the +Z direction, the green light beam GL0 is reflected toward the −Y direction, and the blue light beam BLp is transmitted toward the +Z direction. The blue light beam BLp is emitted outside the dichroic prism 291, and then enters the homogenization device 4 shown in FIG. 1.

The reflecting prism 332 is disposed at the −Y direction side of the dichroic prism 331. The reflecting prism 332 is a prism type reflecting element formed by combining two base members each having a substantially isosceles right triangular prismatic shape with each other to form a substantially rectangular solid shape. On the interface between the two base members, there is disposed a reflecting layer 3321.

The light beam which enters the reflecting layer 3321 along the −Y direction from the dichroic prism 331 is reflected toward the +Z direction by the reflecting layer 3321. The light beam reflected by the reflecting layer 3321 is emitted from the reflecting prism 332 toward the +Z direction. Therefore, in the first period, the green light beam GL1 which enters the reflecting prism 332 along the −Y direction is reflected by the reflecting prism 332 toward the +Z direction. Further, in the second period, the green light beam GL0 which enters the reflecting prism 332 along the −Y direction is reflected by the reflecting prism 332 toward the +Z direction.

Due to the configuration described above, in the light source device 15 according to the present embodiment, the four colored light beams consisting of the blue light beam BLp, the green light beam GL0, the red light beam RL, and the green light beam GL1 are spatially separated from each other to be emitted from the respective positions different from each other. Specifically, in the first period, in the X-Y plane, the red light beam RL emitted from the position at the −X direction side and at the +Y direction side in the light source device 15 enters the plurality of lenses 411 included in the area A1 located at the −X direction side and at the +Y direction side in the first multi-lens 41. The blue light beam BLp emitted from the position at the +X direction side and at the +Y direction side in the light source device 15 enters the plurality of lenses 411 included in the area A2 located at the +X direction side and at the +Y direction side in the first multi-lens 41. The green light beam GL1 emitted from the position at the −X direction side and at the −Y direction side in the light source device 15 enters the plurality of lenses 411 included in the area A3 located at the −X direction side and at the −Y direction side in the first multi-lens 41. The green light beam GL0 emitted from the position at the +X direction side and at the −Y direction side in the light source device 15 enters the plurality of lenses 411 included in the area A4 located at the +X direction side and at the −Y direction side in the first multi-lens 41.

In the second period, the position of incidence of the red light beam RL and the position of incidence of the blue light beam BLp are flipped from the positions of incidence in the first period described above. Further, the position of incidence of the green light beam GL1 and the position of incidence of the green light beam GL0 are flipped from the positions of incidence in the first period described above.

The green light beam GL0 is the green light beam emitted from the green phosphor, and the green light beam GL1 is a green light beam obtained by being separated from the yellow light beam emitted from the yellow phosphor. Therefore, the green light beam GL0 and the green light beam GL1 can have the same wavelength band, or can also have respective wavelength bands different from each other.

Advantages of Third Embodiment

Also in the present embodiment, it is possible to obtain substantially the same advantages as in the first embodiment such as the advantage that it is possible to realize the light source device 15 capable of emitting the plurality of colored light beams made uniform in polarization direction without using the polarization conversion element narrow in pitch, the advantage that it is possible to achieve the reduction in size of the light source device 15 and the projector 1, and the advantage that it is possible to enhance the reliability of the liquid crystal panel 61 forming the light modulation device 6.

Further, the light source device 15 according to the present embodiment is further provided with the second wavelength conversion element 77 which performs the wavelength conversion on the blue light beam BLc1 entering the second wavelength conversion element 77 along the −Z direction from the second retardation element 24 to emit the green light beam GL0 having the green wavelength band toward the +Z direction, the first wavelength conversion element 76 and the second wavelength conversion element 77 are disposed side by side on the same circumference on the substrate 34 centering on the rotational axis Rx, and on the same circumference on the substrate 34 centering on the rotational axis Rx, the first divisional area DB1 where the diffusion elements 75 and the second wavelength conversion element 77 are disposed, and the second divisional area D2 where the first wavelength conversion element 76 is disposed are disposed side by side.

According to this configuration, it is possible to divide the blue light beams BLp, BLs emitted from the light source section 20 into the two blue light beams based on the polarization direction, and make one of the blue light beams enter the first wavelength conversion element 76, and make the other of the blue light beams enter the second wavelength conversion element 77. Therefore, there is no need to use the second light emitting elements for emitting the excitation light which enters the second wavelength conversion element 77, and thus, it is possible to simplify the configuration of the light source section 20 compared to the light source section 21 in the first embodiment.

Further, the light source device 15 according to the present embodiment is further provided with the first color separation element 29 which is disposed at the +Z direction side of the first polarization split element 63, separates the light emitted from the first polarization split element 63 into the blue light beam BLp having the blue wavelength band and the green light beam GL0 having the green wavelength band in the first period, and separates the yellow light beam YL emitted from the first polarization split element 63 into the green light beam GL1 having the green wavelength band and the red light beam RL having the red wavelength band in the second period, and the second color separation element 33 which is disposed at the +Z direction side of the second polarization split element 64, separates the yellow light beam YL emitted from the second polarization split element 64 into the green light beam GL1 having the green wavelength band and the red light beam RL having the red wavelength band in the first period, and separates the light emitted from the second polarization split element 64 into the blue light beam BLp having the blue wavelength band and the green light beam GL0 having the green wavelength band in the second period.

According to this configuration, it is possible to separate each of the two light beams emitted from the first polarization split element 63 and the second polarization split element 64 at respective positions at a distance along the X axis into the two light beams emitted from respective positions at a distance along the Y axis with the first color separation element 29 and the second color separation element 33. Thus, it is possible for the light source device 15 according to the present embodiment to emit the four colored light beams from the respective positions spatially separated from each other in the X-Y plane.

Fourth Embodiment

A fourth embodiment of the present disclosure will hereinafter be described using FIG. 17 through FIG. 19.

A projector according to the fourth embodiment is substantially the same in basic configuration as that of the first embodiment, but is different in the configuration of the light source device from that of the first embodiment. Therefore, in the present embodiment, the overall description of the projector will be omitted.

Figure 17:
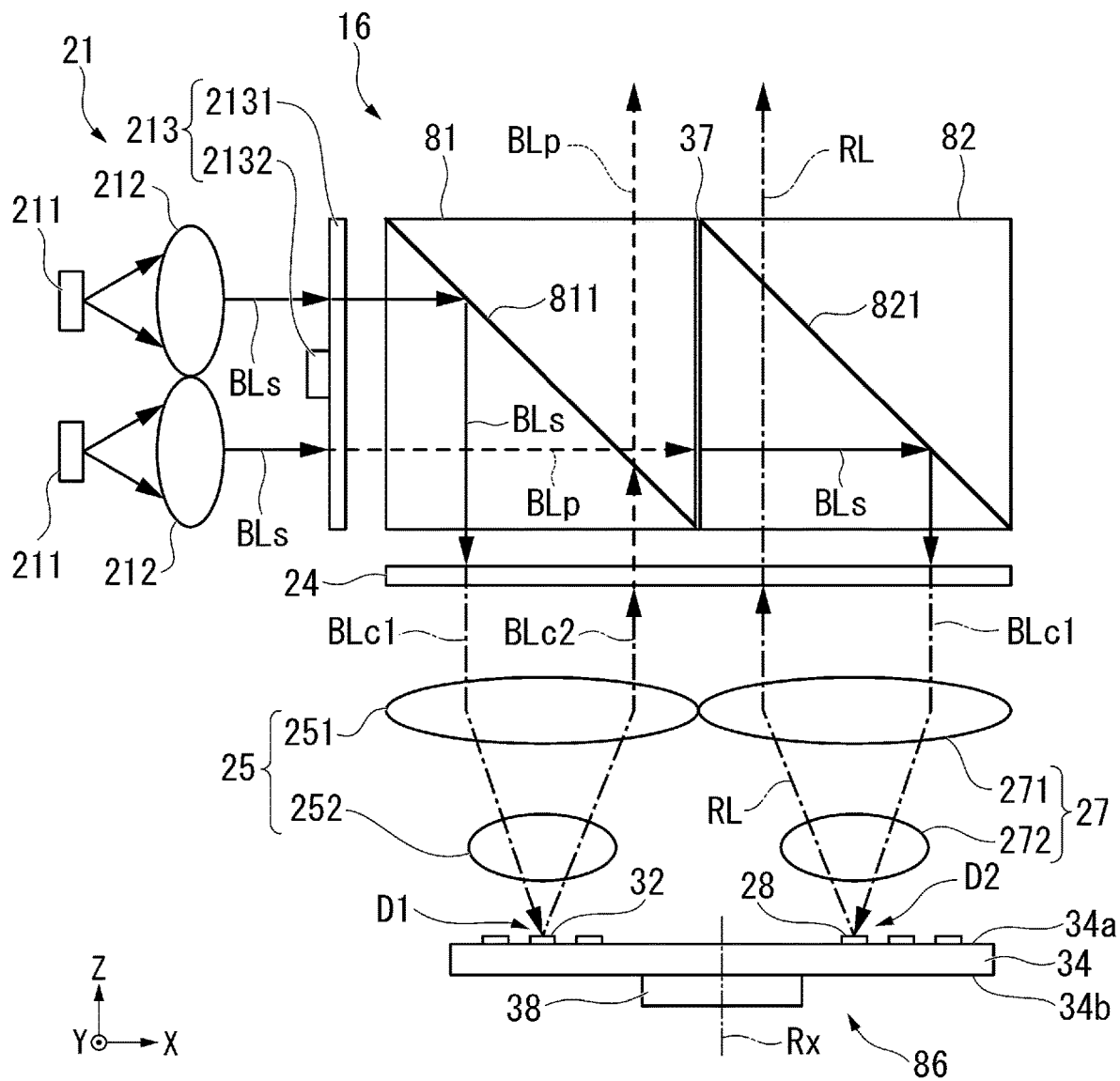
FIG. 17 is a plan view showing a configuration of an upper part of a light source device according to a fourth embodiment viewed from the +Y direction.

FIG. 17 is a plan view showing a configuration of an upper part of the light source device 16 according to the present embodiment viewed from the +Y direction. FIG. 18 is a plan view showing a configuration of a lower part of the light source device 16 viewed from the +Y direction. FIG. 19 is a front view of the light conversion device viewed from the +Z direction.

Figure 18:
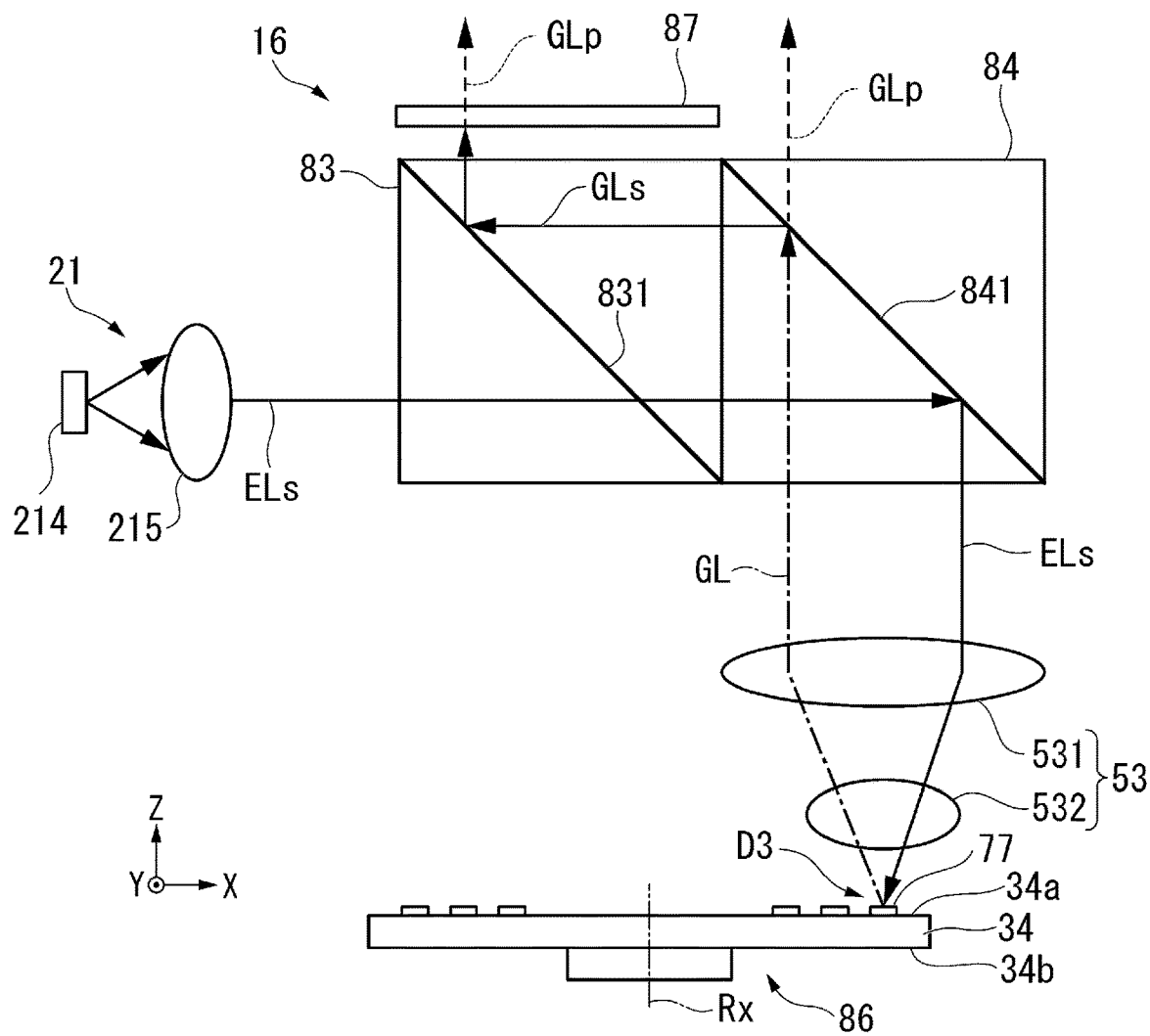
FIG. 18 is a plan view showing a configuration of a lower part of the light source device according to the fourth embodiment viewed from the +Y direction.
Figure 19:
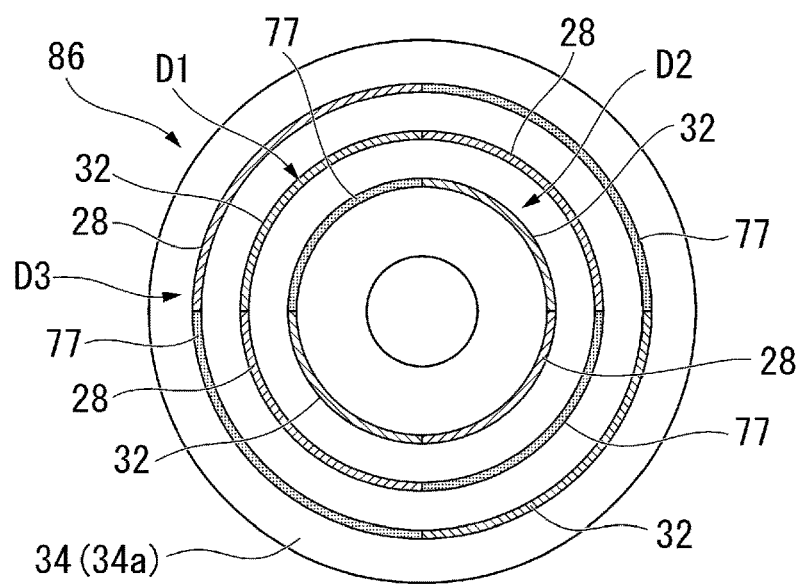
FIG. 19 is a front view of a light conversion device viewed from the +Z direction.

In FIG. 17 through FIG. 19, the constituents common to the drawings used in the previous embodiments are denoted by the same reference symbols, and the description thereof will be omitted.

As shown in FIG. 17 and FIG. 18, the light source device 16 according to the present embodiment has the light source section 21, a first polarization split element 81, the first retardation element 37, a second polarization split element 82, a first optical element 83, a second optical element 84, the second retardation element 24, the first light collection element 25, the second light collection element 27, the third light collection element 53, a light conversion device 86, and a fourth retardation element 87. The configuration of the light source section 21 is substantially the same as that in the first embodiment.

Configuration of Light Conversion Device

As shown in FIG. 19, in the light conversion device 86 in the present embodiment, on the first surface 34a of the substrate 34, there are disposed the first annular area D1, the second annular area D2, and the third annular area D3. The first annular area D1 is irradiated with the blue light beam BLc1 which is emitted from the first polarization split element 81, and enters the substrate 34 via the second retardation element 24 and the first light collection element 25. The second annular area D2 is irradiated with the blue light beam BLc1 which is emitted from the second polarization split element 82, and enters the substrate 34 via the second retardation element 24 and the second light collection element 27. The third annular area D3 is irradiated with the excitation light beam ELs which is emitted from the second optical element 84, and enters the substrate 34 via the third light collection element 53.

In the case of the present embodiment, when viewed clockwise based on a specific position in the circumferential direction of the substrate 34, in the first annular area D1, the diffusion element 32, the first wavelength conversion element 28, the second wavelength conversion element 77, and the first wavelength conversion element 28 are disposed in this order. In the second annular area D2, the second wavelength conversion element 77, the diffusion element 32, the first wavelength conversion element 28, and the diffusion element 32 are disposed in this order. In the third annular area D2, the first wavelength conversion element 28, the second wavelength conversion element 77, the diffusion element 32, and the second wavelength conversion element 77 are disposed in this order.

When irradiating the substrate having the configuration described above with the light from the light source section 21, in the first period, the blue light beam BLc1 from the first polarization split element 81 enters the diffusion element 32 on the first annular area D1, the blue light beam BLc1 from the second polarization split element 82 enters the first wavelength conversion element 28 on the second annular area D2, and the excitation light beam ELs from the second optical element 84 enters the second wavelength conversion element 77 on the third annular area D3.

In the second period subsequent to the first period, the blue light beam BLc1 from the first polarization split element 81 enters the first wavelength conversion element 28 on the first annular area D1, the blue light beam BLc1 from the second polarization split element 82 enters the second wavelength conversion element 77 on the second annular area D2, and the excitation light beam ELs from the second optical element 84 enters the diffusion element 32 on the third annular area D3.

In a third period subsequent to the second period, the blue light beam BLc1 from the first polarization split element 81 enters the diffusion element 32 on the first annular area D1, the blue light beam BLc1 from the second polarization split element 82 enters the first wavelength conversion element 28 on the second annular area D2, and the excitation light beam ELs from the second optical element 84 enters the second wavelength conversion element 77 on the third annular area D3.

In a fourth period subsequent to the third period, the blue light beam BLc1 from the first polarization split element 81 enters the second wavelength conversion element 77 on the first annular area D1, the blue light beam BLc1 from the second polarization split element 82 enters the diffusion element 32 on the second annular area D2, and the excitation light beam ELs from the second optical element 84 enters the first wavelength conversion element 28 on the third annular area D3. Subsequently, returning to the first period, this cycle is repeated.

Configuration of First Polarization Split Element

A first polarization split layer 811 of the first polarization split element 81 has a polarization split characteristic of transmitting the P-polarized light and reflecting the S-polarized light with respect to the light having the blue wavelength band, and a characteristic of transmitting the light in the wavelength band other than the blue wavelength band irrespective of the polarization state. Therefore, the first polarization split element 81 transmits the blue light beam BLp as the P-polarized light which enters the first polarization split element 81 along the +X direction from the light source section 21 toward the +X direction, and reflects the blue light beam BLs as the S-polarized light which enters the first polarization split element 81 along the +X direction from the light source section 21 toward the −Z direction.

Further, the first polarization split element 81 transmits the blue light beam BLp which enters the first polarization split element 81 along the +Z direction from the diffusion element 32 toward the +Z direction, transmits the red light beam RL which enters the first polarization split element 81 along the +Z direction from the first wavelength conversion element 28 toward the +Z direction, and transmits the green light beam GL which enters the first polarization split element 81 along the +Z direction from the second wavelength conversion element 77 toward the +Z direction.

Configuration of Second Polarization Split Element

A second polarization split layer 821 of the second polarization split element 82 has a polarization split characteristic of transmitting the P-polarized light and reflecting the S-polarized light with respect to the light having the blue wavelength band, and a characteristic of transmitting the light in the wavelength band other than the blue wavelength band irrespective of the polarization state. Therefore, the blue light beam BLs as the S-polarized light which enters the second polarization split element 82 along the +X direction from the first retardation element 37 is reflected by the second polarization split element 82 toward the −Z direction. Further, the second polarization split element 82 transmits the blue light beam BLp which enters the second polarization split element 82 along the +Z direction from the diffusion element 32 toward the +Z direction, transmits the red light beam RL which enters the second polarization split element 82 along the +Z direction from the first wavelength conversion element 28 toward the +Z direction, and transmits the green light beam GL which enters the second polarization split element 82 along the +Z direction from the second wavelength conversion element 77 toward the +Z direction.

Configuration of First Optical Element

A first optical layer 831 of the first optical element 83 has a characteristic of transmitting the light having the blue wavelength band irrespective of the polarization state, and reflecting the light having a wavelength band other than the blue wavelength band irrespective of the polarization state. In other words, the first optical layer 831 can be formed of a dichroic layer. Thus, the excitation light beam ELs which enters the first optical element 83 along the +X direction from the light source section 21 is transmitted by the first optical element 83 toward the +X direction. Further, the first optical element 83 transmits the blue light beam BLs as the S-polarized light which enters the first optical element 83 along the −X direction from the second optical element 84 toward the −X direction, reflects the red light beam RL which enters the first optical element 83 along the −X direction from the second optical element 84 toward the +Z direction, and reflects the green light beam GL which enters the first optical element 83 along the −X direction from the second optical element 84 toward the +Z direction.

Configuration of Second Optical Element

A second optical layer 841 of the second optical element 84 has a polarization split characteristic of transmitting the P-polarized light and reflecting the S-polarized light with respect to the light in the blue wavelength band, and has a polarization split characteristic of transmitting the P-polarized light and reflecting the S-polarized light with respect to the light having a wavelength band other than the blue wavelength band, namely the wavelength band including the green wavelength band and the red wavelength band. In other words, the second optical layer 841 can be formed of a polarization split layer corresponding to the entire visible band. Thus, the excitation light beam ELs as the S-polarized light which enters the second optical element 84 along the +X direction from the first retardation element 37 is reflected by the second optical element 84 toward the −Z direction. Further, the second optical element 84 transmits the blue light beam BLp as the P-polarized light which enters the second optical element 84 along the +Z direction from the diffusion element 32 toward the +Z direction, transmits a red light beam RLp as the P-polarized light out of the red light beam RL which enters the second optical element 84 along the +Z direction from the first wavelength conversion element 28 toward the +Z direction, reflects a red light beam RLs as the S-polarized light out of the red light beam RL which enters the second optical element 84 along the +Z direction from the first wavelength conversion element 28 toward the −X direction, transmits a green light beam GLp as the P-polarized light out of the green light beam GL which enters the second optical element 84 along the +Z direction from the second wavelength conversion element 77 toward the +Z direction, and reflects a green light beam GLs as the S-polarized light out of the green light beam GL which enters the second optical element 84 along the +Z direction from the second wavelength conversion element 77 toward the −X direction.

Due to the configuration described above, in the first period, the blue light beam BLp is emitted from the first polarization split element 81 and then enters the first sub-pixel SX1, the red light beam RL is emitted from the second polarization split element 82 and then enters the second sub-pixel SX2, the green light beam GLp is emitted from the first optical element 83 and then enters the third sub-pixel SX3, and the green light beam GLp is emitted from the second optical element 84 and then enters the fourth sub-pixel SX4.

Then, in the second period, the red light beam RL is emitted from the first polarization split element 81 and then enters the first sub-pixel SX1, the green light beam GL is emitted from the second polarization split element 82 and then enters the second sub-pixel SX2, the blue light beam BLp is emitted from the first optical element 83 and then enters the third sub-pixel SX3, and no light is emitted from the second optical element 84.

Then, in the third period, the blue light beam BLp is emitted from the first polarization split element 81 and then enters the first sub-pixel SX1, the red light beam RL is emitted from the second polarization split element 82 and then enters the second sub-pixel SX2, the green light beam GLs is emitted from the first optical element 83 and then enters the third sub-pixel SX3, and the green light beam GLp is emitted from the second optical element 84 and then enters the fourth sub-pixel SX4.

Then, in the fourth period, the green light beam GL is emitted from the first polarization split element 81 and then enters the first sub-pixel SX1, the blue light beam BLp is emitted from the second polarization split element 82 and then enters the second sub-pixel SX2, the red light beam RLs is emitted from the first optical element 83 and then enters the third sub-pixel SX3, and the red light beam RLp is emitted from the second optical element 84 and then enters the fourth sub-pixel SX4. Subsequently, returning to the first period, this cycle is repeated.

It should be noted that the fourth retardation element 87 formed of a ½ wave plate with respect to the wavelength band including the green wavelength band and the red wavelength band is disposed on the light path of the light emitted from the first optical element 83. Therefore, the green light beam GLs and the red light beam RLs as the S-polarized light emitted from the first optical element 83 are converted into the green light beam GLp and the red light beam RLp as the P-polarized light.

Advantages of Fourth Embodiment

Also in the present embodiment, it is possible to obtain substantially the same advantages as in the first embodiment such as the advantage that it is possible to realize the light source device 16 capable of emitting the plurality of colored light beams made uniform in polarization direction without using the polarization conversion element narrow in pitch, the advantage that it is possible to achieve the reduction in size of the light source device 16 and the projector 1, and the advantage that it is possible to enhance the reliability of the liquid crystal panel forming the light modulation device.

In the light source device according to the first through third embodiments, there is provided the configuration in which the colored light beams entering the two sub-pixels SX out of the four sub-pixels constituting one pixel PX of the liquid crystal panel 61 are interchanged between the blue light beam and other colored light beams. In contrast, in the light source device 16 according to the present embodiment, there is provided the configuration in which the three colors of colored light beams alternately enter the four sub-pixels SX constituting one pixel PX of the liquid crystal panel 61. Also in this configuration, the damage of the liquid crystal panel 61 caused by continuously irradiating a specific sub-pixel SX with the blue light is suppressed, and thus, it is possible to enhance the reliability of the liquid crystal panel 61.

It should be noted that the scope of the present disclosure is not limited to the embodiments described above, but a variety of modifications can be provided thereto within the scope or the spirit of the present disclosure.

For example, in the embodiments described above, there is illustrated the configuration in which the first wavelength conversion element includes the red phosphor, and the second wavelength conversion element includes the green phosphor, but instead of this configuration, the first wavelength conversion element can include the green phosphor, and the second wavelength conversion element can include the red phosphor.

Further, in the embodiments described above, the light source device is provided with the first light collection element 25 and the second light collection element 27. However, this configuration is not a limitation, and at least one of the first light collection element 25 and the second light collection element 27 is not required to be disposed.

In each of the embodiments described above, the light source section 21 emits the blue light beams BLs, BLp toward the +X direction. However, this is not a limitation, and it is also possible to adopt a configuration in which the light source section 21 emits the blue light beams BLs, BLp in a direction crossing the +X direction, and the blue light beams BLs, BLp are reflected using, for example, a reflecting member, and are then made to enter the first polarization split element 22 in the +X direction.

In each of the embodiments described above, the projector is provided with the homogenization device 4 having the first multi-lens 41, the second multi-lens 42, and the superimposing lens 43. It is possible to dispose a homogenization device having other configurations instead of this configuration, or it is not required to dispose the homogenization device 4.

The light source device according to each of the embodiments described above emits the colored light beams from the four exit positions, respectively, and the liquid crystal panel 61 constituting the light modulation device 6 has the four sub-pixels SX in each of the pixels PX. Instead of this configuration, it is possible to adopt a configuration in which the light source device emits three colored light beams, and the liquid crystal panel has three sub-pixels in each pixel.

Further, in the embodiments described above, the polarization state of the colored light beams emitted by the light source device can be another polarization state. For example, it is possible for the light source device to have a configuration of emitting a plurality of colored light beams which are each S-polarized light, and are spatially separated from each other. Further, the colored light beams emitted by the light source device are not limited to the blue light beam, the red light beam, and the green light beam, but can also be other colored light beams. For example, it is possible for the light source device to have a configuration of emitting yellow light or white light. Therefore, in the light source device according to the third embodiment, the color separation element for separating the yellow light into the green light and the red light can be eliminated.

Besides the above, the specific descriptions of the shape, the number, the arrangement, the material, and so on of the constituents of the light source device and the projector are not limited to those of the embodiments described above, but can arbitrarily be modified. Further, although in the embodiments described above, there is described the example of installing the light source device according to the present disclosure in the projector, the example is not a limitation. The light source device according to an aspect of the present disclosure can also be applied to lighting equipment, a headlight of a vehicle, and so on.

A light source device according to an aspect of the present disclosure may have the following configuration.

The light source device according to the aspect of the present disclosure includes a light source section configured to emit light which has a first wavelength band and includes a first light beam polarized in a first polarization direction and the first light beam polarized in a second polarization direction different from the first polarization direction, a first polarization split element configured to transmit the first light beam which is polarized in the first polarization direction and enters the first polarization split element along a first direction from the light source section toward the first direction, and configured to reflect the first light beam which is polarized in the second polarization direction toward a second direction crossing the first direction, a first retardation element disposed at the first direction side of the first polarization split element, and configured to convert the first light beam which is polarized in the first polarization direction and enters the first retardation element along the first direction from the first polarization split element into the first light beam polarized in the second polarization direction, a second polarization split element disposed at the first direction side of the first retardation element, and configured to reflect the first light beam which is polarized in the second polarization direction and enters the second polarization split element along the first direction from the first retardation element toward the second direction, a second retardation element which the first light beam polarized in the second polarization direction enters along the second direction from the first polarization split element and the second polarization split element, and a light conversion device having a diffusion element configured to diffuse the first light beam which enters the diffusion element along the second direction from the second retardation element to emit the first light beam diffused toward a third direction as an opposite direction to the second direction, a first wavelength conversion element configured to perform wavelength conversion on the first light beam which enters the first wavelength conversion element along the second direction from the second retardation element to emit a second light beam having a second wavelength band different from the first wavelength band toward the third direction, and a substrate which rotates around a rotational axis along a proceeding direction of the first light beam, wherein the diffusion element and the first wavelength conversion element are disposed side by side on a same circumference centering on the rotational axis on a surface of the substrate, the second retardation element is disposed between the first polarization split element and the substrate, the second retardation element is disposed between the second polarization split element and the substrate, the first polarization split element transmits the first light beam which enters the first polarization split element along the third direction from the diffusion element toward the third direction, and transmits the second light beam which enters the first polarization split element along the third direction from the first wavelength conversion element toward the third direction, and the second polarization split element transmits the first light beam which enters the second polarization split element along the third direction from the diffusion element toward the third direction, and transmits the second light beam which enters the second polarization split element along the third direction from the first wavelength conversion element toward the third direction.

In the light source device according to the aspect of the present disclosure, there may further be included a first optical element disposed at a fifth direction side of the first polarization split element, and configured to transmit the first light beam which enters the first optical element along the first direction from the light source section toward the first direction, the fifth direction crossing the first direction, the second direction, and the third direction, a second optical element disposed at the first direction side of the first optical element, and configured to reflect the first light beam which enters the second optical element along the first direction from the first optical element toward the second direction, and a second wavelength conversion element disposed at the second direction side of the second optical element, and configured to perform wavelength conversion on the first light beam which enters the second wavelength conversion element from the second optical element to emit a third light beam having a third wavelength band different from the first wavelength band and the second wavelength band toward the third direction, wherein the third light beam may enter the second optical element along the third direction from the second wavelength conversion element, the second optical element may transmit the third light beam polarized in the first polarization direction toward the third direction, and reflect the third light beam polarized in the second polarization direction toward a fourth direction as an opposite direction to the first direction, and the first optical element may reflect the third light beam which is polarized in the second polarization direction and enters the first optical element along the fourth direction from the second optical element toward the third direction.

In the light source device according to the aspect of the present disclosure, the light source section may include a first light emitting element configured to emit the first light beam having the first wavelength band, and a second light emitting element configured to emit an excitation light beam having an excitation wavelength band for exciting the second wavelength conversion element.

In the light source device according to the aspect of the present disclosure, the first wavelength band and the excitation wavelength band may be the same wavelength band.

In the light source device according to the aspect of the present disclosure, the second wavelength conversion element may be disposed on a surface of the substrate, and in a radial direction centering on the rotational axis, a distance of the second wavelength conversion element from the rotational axis may be longer than distances of the diffusion element and the first wavelength conversion element from the rotational axis.

In the light source device according to the aspect of the present disclosure, there may further be included a second wavelength conversion element configured to perform wavelength conversion on the first light beam which enters the second wavelength conversion element along the second direction from the second retardation element to emit a third light beam having a third wavelength band different from the first wavelength band and the second wavelength band toward the third direction, wherein the first wavelength conversion element and the second wavelength conversion element may be disposed side by side on a same circumference on the substrate centering on the rotational axis, and a first divisional area where the diffusion element and the second wavelength conversion element and a second divisional area where the first wavelength conversion element is disposed may be disposed side by side on a same circumference on the substrate centering on the rotational axis.

In the light source device according to the aspect of the present disclosure, there may further be included a first color separation element disposed at the third direction side of the first polarization split element, configured to separate light emitted from the first polarization split element into the third light beam having the first wavelength band and a fourth light beam having the third wavelength band in a first period, and configured to separate the light emitted from the first polarization split element into a fifth light beam having a fourth wavelength band different from the first wavelength band and the second wavelength band and a sixth light beam having a fifth wavelength band different from the first wavelength band, the second wavelength band, the third wavelength band, and the fourth wavelength band in a second period different from the first period, and a second color separation element disposed at the third direction side of the second polarization split element, configured to separate light emitted from the second polarization split element into the fifth light beam having the fourth wavelength band and the sixth light beam having the fifth wavelength band in the first period, and configured to separate the light emitted from the second polarization split element into the third light beam having the first wavelength band and the third light having the third wavelength band in the second period.

In the light source device according to the aspect of the present disclosure, the light source section may include a first light emitting element configured to emit the first light beam having the first wavelength band, and a third retardation element configured to convert the first light beam which enters the third retardation element from the first light emitting element into light including the first light beam polarized in the first polarization direction and the first light beam polarized in the second polarization direction.

In the light source device according to the aspect of the present disclosure, the third retardation element may be made rotatable around a rotational axis along a proceeding direction of the light entering the third retardation element.

A projector according to an aspect of the present disclosure may have the following configuration.

The projector according to the aspect of the present disclosure includes the light source device according to the aspect of the present disclosure, a light modulation device configured to modulate light from the light source device in accordance with image information, and a projection optical device configured to project the light modulated by the light modulation device.

In the projector according to the aspect of the present disclosure, there may further be included a homogenization device disposed between the light source device and the light modulation device, wherein the homogenization device may include a pair of multi-lenses configured to divide the light entering the pair of multi-lenses from the light source device into a plurality of partial light beams, and a superimposing lens configured to superimpose the plurality of partial light beams entering the superimposing lens from the pair of multi-lenses on the light modulation device.

In the projector according to the aspect of the present disclosure, the light modulation device may include a liquid crystal panel having a plurality of pixels, and a microlens array which is disposed at a light incident side of the liquid crystal panel, and has a plurality of microlenses corresponding to the plurality of pixels, the pixels may each include a first sub-pixel, a second sub-pixel, a third sub-pixel, and a fourth sub-pixel, and the microlens may make the third light beam enter the first sub-pixel, the fourth light beam enter the second sub-pixel, the fifth light beam enter the third sub-pixel, and the sixth light beam enter the fourth sub-pixel.

A display device according to an aspect of the present disclosure may have the following configuration.

The display device according to the aspect of the present disclosure includes a light source device, and a light modulation device configured to modulate light from the light source device in accordance with image information, wherein the light modulation device has a liquid crystal panel having a plurality of pixels, each of the pixels has at least a first sub-pixel and a second sub-pixel, the light source device emits a first light beam having a first wavelength band, and emits a second light beam having a second wavelength band different from the first wavelength band, and the light source device has a switching section configured to switch between a first state in which the first light beam enters the first sub-pixel, and the second light beam enters the second sub-pixel, and a second state in which the first light beam enters the second sub-pixel, and the second light beam enters the first sub-pixel.

What is claimed is:

1. A light source device comprising:
a light source section configured to emit light which has a first wavelength band and includes a first light beam polarized in a first polarization direction and the first light beam polarized in a second polarization direction different from the first polarization direction;
a first polarization split element configured to transmit the first light beam which is polarized in the first polarization direction and enters the first polarization split element along a first direction from the light source section toward the first direction, and configured to reflect the first light beam which is polarized in the second polarization direction toward a second direction crossing the first direction;
a first retardation element disposed at the first direction side of the first polarization split element, and configured to convert the first light beam which is polarized in the first polarization direction and enters the first retardation element along the first direction from the first polarization split element into the first light beam polarized in the second polarization direction;
a second polarization split element disposed at the first direction side of the first retardation element, and configured to reflect the first light beam which is polarized in the second polarization direction and enters the second polarization split element along the first direction from the first retardation element toward the second direction;
a second retardation element which the first light beam polarized in the second polarization direction enters along the second direction from the first polarization split element and the second polarization split element; and
a light conversion device having a diffusion element configured to diffuse the first light beam which enters the diffusion element along the second direction from the second retardation element to emit the first light beam diffused toward a third direction as an opposite direction to the second direction, a first wavelength conversion element configured to perform wavelength conversion on the first light beam which enters the first wavelength conversion element along the second direction from the second retardation element to emit a second light beam having a second wavelength band different from the first wavelength band toward the third direction, and a substrate which rotates around a rotational axis along a proceeding direction of the first light beam, wherein
the diffusion element and the first wavelength conversion element are disposed side by side on a same circumference centering on the rotational axis on a surface of the substrate,
the second retardation element is disposed between the first polarization split element and the substrate,
the second retardation element is disposed between the second polarization split element and the substrate,
the first polarization split element transmits the first light beam which enters the first polarization split element along the third direction from the diffusion element toward the third direction, and transmits the second light beam which enters the first polarization split element along the third direction from the first wavelength conversion element toward the third direction, and
the second polarization split element transmits the first light beam which enters the second polarization split element along the third direction from the diffusion element toward the third direction, and transmits the second light beam which enters the second polarization split element along the third direction from the first wavelength conversion element toward the third direction.

2. The light source device according to claim 1, further comprising:
a first optical element disposed at a fifth direction side of the first polarization split element, and configured to transmit the first light beam which enters the first optical element along the first direction from the light source section toward the first direction, the fifth direction crossing the first direction, the second direction, and the third direction;
a second optical element disposed at the first direction side of the first optical element, and configured to reflect the first light beam which enters the second optical element along the first direction from the first optical element toward the second direction; and a second wavelength conversion element disposed at the second direction side of the second optical element, and configured to perform wavelength conversion on the first light beam which enters the second wavelength conversion element from the second optical element to emit a third light beam having a third wavelength band different from the first wavelength band and the second wavelength band toward the third direction, wherein the third light beam enters the second optical element along the third direction from the second wavelength conversion element, the second optical element transmits the third light beam polarized in the first polarization direction toward the third direction, and reflects the third light beam polarized in the second polarization direction toward a fourth direction as an opposite direction to the first direction, and the first optical element reflects the third light beam which is polarized in the second polarization direction and enters the first optical element along the fourth direction from the second optical element toward the third direction.

3. The light source device according to claim 2, wherein the light source section includes
a first light emitting element configured to emit the first light beam having the first wavelength band, and
a second light emitting element configured to emit an excitation light beam having an excitation wavelength band for exciting the second wavelength conversion element.

4. The light source device according to claim 3, wherein the first wavelength band and the excitation wavelength band are a same wavelength band.

5. The light source device according to claim 2, wherein the second wavelength conversion element is disposed on a surface of the substrate, and
in a radial direction centering on the rotational axis, a distance of the second wavelength conversion element from the rotational axis is longer than distances of the diffusion element and the first wavelength conversion element from the rotational axis.

6. The light source device according to claim 1, further comprising:
a second wavelength conversion element configured to perform wavelength conversion on the first light beam which enters the second wavelength conversion element along the second direction from the second retardation element to emit a third light beam having a third wavelength band different from the first wavelength band and the second wavelength band toward the third direction, wherein
the first wavelength conversion element and the second wavelength conversion element are disposed side by side on a same circumference on the substrate centering on the rotational axis, and
a first divisional area where the diffusion element and the second wavelength conversion element and a second divisional area where the first wavelength conversion element is disposed are disposed side by side on a same circumference on the substrate centering on the rotational axis.

7. The light source device according to claim 6, further comprising:
a first color separation element disposed at the third direction side of the first polarization split element, configured to separate light emitted from the first polarization split element into the third light beam having the first wavelength band and a fourth light beam having the third wavelength band in a first period, and configured to separate the light emitted from the first polarization split element into a fifth light beam having a fourth wavelength band different from the first wavelength band and the second wavelength band and a sixth light beam having a fifth wavelength band different from the first wavelength band, the second wavelength band, the third wavelength band, and the fourth wavelength band in a second period different from the first period; and
a second color separation element disposed at the third direction side of the second polarization split element, configured to separate light emitted from the second polarization split element into the fifth light beam having the fourth wavelength band and the sixth light beam having the fifth wavelength band in the first period, and configured to separate the light emitted from the second polarization split element into the third light beam having the first wavelength band and the third light beam having the third wavelength band in the second period.

8. The light source device according to claim 1, wherein the light source section includes
a first light emitting element configured to emit the first light beam having the first wavelength band, and
a third retardation element configured to convert the first light beam which enters the third retardation element from the first light emitting element into light including the first light beam polarized in the first polarization direction and the first light beam polarized in the second polarization direction.

9. The light source device according to claim 8, wherein the third retardation element is made rotatable around a rotational axis along a proceeding direction of the light entering the third retardation element.

10. A projector comprising:
the light source device according to claim 7;
a light modulation device configured to modulate light from the light source device in accordance with image information; and
a projection optical device configured to project the light modulated by the light modulation device.

11. The projector according to claim 10, further comprising:
a homogenization device disposed between the light source device and the light modulation device, wherein
the homogenization device includes
a pair of multi-lenses configured to divide the light entering the pair of multi-lenses from the light source device into a plurality of partial light beams, and
a superimposing lens configured to superimpose the plurality of partial light beams entering the superimposing lens from the pair of multi-lenses on the light modulation device.

12. The projector according to claim 11, wherein
the light modulation device includes a liquid crystal panel having a plurality of pixels, and a microlens array which is disposed at a light incident side of the liquid crystal panel, and has a plurality of microlenses corresponding to the plurality of pixels,
the pixels each include a first sub-pixel, a second sub-pixel, a third sub-pixel, and a fourth sub-pixel, and
the microlens makes
the third light beam enter the first sub-pixel,
the fourth light beam enter the second sub-pixel,
the fifth light beam enter the third sub-pixel, and
the sixth light beam enter the fourth sub-pixel.

* * * * *